US012658653B2

(12) United States Patent
Huang et al.

(10) Patent No.: US 12,658,653 B2
(45) Date of Patent: Jun. 16, 2026

(54) ELECTRICAL CONNECTOR WITH IMPROVED SHIELDING OF CONDUCTIVE TERMINALS

(71) Applicant: DONGGUAN LUXSHARE TECHNOLOGIES CO., LTD, Dongguan City (CN)

(72) Inventors: Bin Huang, Dongguan City (CN); Chenhui Zeng, Dongguan City (CN); Kunlin Yao, Dongguan City (CN); Qiongnan Chen, Dongguan City (CN); Hongji Chen, Dongguan City (CN); Cheng Li, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 368 days.

(21) Appl. No.: 18/530,868

(22) Filed: Dec. 6, 2023

(65) Prior Publication Data

US 2025/0112416 A1 Apr. 3, 2025

(30) Foreign Application Priority Data

Sep. 28, 2023 (CN) ........................ 202311286913.X

(51) Int. Cl.
*H01R 13/6588* (2011.01)
*H01R 13/6594* (2011.01)
*H01R 13/6599* (2011.01)

(52) U.S. Cl.
CPC ..... *H01R 13/6594* (2013.01); *H01R 13/6588* (2013.01); *H01R 13/6599* (2013.01)

(58) Field of Classification Search
None
See application file for complete search history.

(56) References Cited

U.S. PATENT DOCUMENTS 4,703,986 A 11/1987 McCormick
6,361,373 B1 3/2002 Horchler
(Continued)

FOREIGN PATENT DOCUMENTS

CN 1663081 A 8/2005
CN 2796175 Y 7/2006
(Continued)

OTHER PUBLICATIONS

U.S. Notice of Allowance for U.S. Appl. No. 18/532,523, dated Jan. 27, 2026.

(Continued)

*Primary Examiner* — Tho D Ta
(74) *Attorney, Agent, or Firm* — Birch, Stewart, Kolasch & Birch, LLP

(57) ABSTRACT

An electrical connector includes a housing, a number of first conductive terminals, a number of second conductive terminals and a mounting block. Each first conductive terminal includes a first fixing portion and a second fixing portion. Each second conductive terminal includes a third fixing portion and a fourth fixing portion. The mounting block is mounted to the housing. The mounting block includes a base and a convex block protruding from the base. The base includes a number of first receiving grooves and a number of second receiving grooves. The second fixing portion is at least partially located in a corresponding first receiving groove. The fourth fixing portion is at least partially located in a corresponding second receiving groove. The convex block is located between the second fixing portion and the fourth fixing portion.

20 Claims, 20 Drawing Sheets

(56) References Cited

U.S. PATENT DOCUMENTS

| | | | | |
|---|---|---|---|---|
| 7,128,588 | B2 | 10/2006 | Hu et al. | |
| 7,297,024 | B2 | 11/2007 | Ni et al. | |
| 8,858,237 | B2 | 10/2014 | Hsu et al. | |
| 9,350,121 | B2 | 5/2016 | Ju et al. | |
| 9,401,570 | B2 | 7/2016 | Phillips et al. | |
| 9,450,355 | B2 | 9/2016 | Zhang | |
| 9,461,378 | B1 | 10/2016 | Chen | |
| 9,478,889 | B2 | 10/2016 | Oshida | |
| 9,509,098 | B1 | 11/2016 | Henry et al. | |
| 9,799,994 | B2 | 10/2017 | Chen | |
| 9,812,823 | B2 * | 11/2017 | Kawakami | H01R 12/724 |
| 9,972,945 | B1 | 5/2018 | Huang et al. | |
| 10,050,365 | B1 | 8/2018 | Ju | |
| 10,103,501 | B2 | 10/2018 | Lin et al. | |
| 10,276,983 | B2 | 4/2019 | Arai et al. | |
| 10,714,877 | B2 | 7/2020 | Zhou | |
| 10,763,624 | B1 | 9/2020 | Henry et al. | |
| 11,031,708 | B2 | 6/2021 | Teh | |
| 11,108,194 | B2 * | 8/2021 | Lin | H01R 13/6471 |
| 11,189,972 | B2 | 11/2021 | Casher et al. | |
| 11,196,220 | B2 | 12/2021 | Tu et al. | |
| 11,283,221 | B2 * | 3/2022 | Hsueh | H01R 13/6585 |
| 11,749,947 | B2 | 9/2023 | Huang et al. | |
| 11,984,680 | B2 | 5/2024 | Fan et al. | |
| 12,294,187 | B2 | 5/2025 | Liu et al. | |
| 2002/0115318 | A1 | 8/2002 | Apicelli | |
| 2003/0143894 | A1 | 7/2003 | Kline et al. | |
| 2003/0180011 | A1 | 9/2003 | Aronson | |
| 2006/0270254 | A1 | 11/2006 | Chiang et al. | |
| 2009/0305574 | A1 | 12/2009 | Chen et al. | |
| 2010/0210139 | A1 | 8/2010 | Wei | |
| 2011/0009001 | A1 | 1/2011 | Chen et al. | |
| 2013/0189858 | A1 | 7/2013 | Johnescu et al. | |
| 2013/0303005 | A1 | 11/2013 | Chiba et al. | |
| 2014/0024257 | A1 | 1/2014 | Castillo et al. | |
| 2014/0273585 | A1 | 9/2014 | Dang | |
| 2015/0004839 | A1 | 1/2015 | Wang et al. | |
| 2015/0111401 | A1 | 4/2015 | Guo | |
| 2016/0043511 | A1 | 2/2016 | Hsu | |
| 2016/0181734 | A1 | 6/2016 | Kao et al. | |
| 2017/0033482 | A1 | 2/2017 | Liao | |
| 2017/0033506 | A1 | 2/2017 | Hsu et al. | |
| 2017/0070013 | A1 | 3/2017 | Hsu et al. | |
| 2017/0207581 | A1 | 7/2017 | Zhang | |
| 2017/0352992 | A1 | 12/2017 | Lin et al. | |
| 2017/0358885 | A1 | 12/2017 | Okuyama et al. | |
| 2018/0294592 | A1 | 10/2018 | Huang et al. | |
| 2019/0131745 | A1 | 5/2019 | Zhao et al. | |
| 2019/0199028 | A1 | 6/2019 | Maesoba et al. | |
| 2019/0221972 | A1 | 7/2019 | Hou et al. | |
| 2019/0393634 | A1 | 12/2019 | Kao et al. | |
| 2020/0091635 | A1 | 3/2020 | Horh | |
| 2020/0176937 | A1 | 6/2020 | Azad | |
| 2020/0235535 | A1 | 7/2020 | Tsai et al. | |
| 2020/0303854 | A1 | 9/2020 | Jin | |
| 2020/0335890 | A1 | 10/2020 | Liu et al. | |
| 2020/0343661 | A1 | 10/2020 | Wu et al. | |
| 2020/0412067 | A1 | 12/2020 | Xu et al. | |
| 2021/0075143 | A1 | 3/2021 | Laurx et al. | |
| 2021/0075164 | A1 | 3/2021 | Chen et al. | |
| 2021/0194187 | A1 | 6/2021 | Chen et al. | |
| 2021/0203107 | A1 | 7/2021 | Liu et al. | |
| 2021/0203108 | A1 | 7/2021 | Liu et al. | |
| 2021/0296831 | A1 | 9/2021 | Wu et al. | |
| 2021/0336386 | A1 | 10/2021 | Wu et al. | |
| 2021/0399498 | A1 * | 12/2021 | Liu | H01R 43/24 |
| 2022/0006217 | A1 | 1/2022 | Huang et al. | |
| 2022/0052469 | A1 | 2/2022 | Huang et al. | |
| 2022/0052492 | A1 | 2/2022 | Guo et al. | |
| 2022/0115818 | A1 | 4/2022 | Little et al. | |
| 2022/0216652 | A1 | 7/2022 | Chen et al. | |
| 2022/0224054 | A1 | 7/2022 | Xu et al. | |
| 2022/0344854 | A1 | 10/2022 | Huang et al. | |
| 2022/0352667 | A1 | 11/2022 | Chen et al. | |
| 2023/0128860 | A1 | 4/2023 | Liu et al. | |
| 2023/0144251 | A1 | 5/2023 | Lee et al. | |
| 2023/0216248 | A1 | 7/2023 | Huang et al. | |
| 2023/0238723 | A1 * | 7/2023 | Chen | H01R 13/6591 439/62 |
| 2023/0261425 | A1 | 8/2023 | Sun | |
| 2023/0283025 | A1 | 9/2023 | Lin et al. | |
| 2023/0318213 | A1 | 10/2023 | Lu | |
| 2023/0335934 | A1 | 10/2023 | Fu et al. | |
| 2023/0420882 | A1 | 12/2023 | Hsu et al. | |
| 2024/0030658 | A1 | 1/2024 | Little | |
| 2024/0063564 | A1 | 2/2024 | Hsu et al. | |
| 2024/0178620 | A1 | 5/2024 | Li et al. | |
| 2024/0235120 | A1 | 7/2024 | Chen et al. | |
| 2024/0305027 | A1 | 9/2024 | Xiao et al. | |
| 2024/0313476 | A1 | 9/2024 | Tuin et al. | |
| 2024/0347955 | A1 | 10/2024 | Huang et al. | |
| 2024/0347983 | A1 | 10/2024 | Liu et al. | |
| 2024/0364057 | A1 | 10/2024 | Zhu et al. | |
| 2024/0413587 | A1 | 12/2024 | Eroglu et al. | |
| 2024/0429659 | A1 | 12/2024 | Wu et al. | |
| 2025/0047042 | A1 | 2/2025 | Zhang et al. | |
| 2025/0055230 | A1 | 2/2025 | Shioda et al. | |
| 2025/0055232 | A1 | 2/2025 | Shioda et al. | |
| 2025/0079735 | A1 | 3/2025 | Little | |

FOREIGN PATENT DOCUMENTS

| | | | |
|---|---|---|---|
| CN | 2891330 | Y | 4/2007 |
| CN | 101453088 | A | 6/2009 |
| CN | 201374459 | Y | 12/2009 |
| CN | 101847800 | A | 9/2010 |
| CN | 201797172 | U | 4/2011 |
| CN | 102170077 | A | 8/2011 |
| CN | 102315560 | A | 1/2012 |
| CN | 102646878 | A | 8/2012 |
| CN | 103296537 | A | 9/2013 |
| CN | 203192962 | U | 9/2013 |
| CN | 203326218 | U | 12/2013 |
| CN | 103579835 | A | 2/2014 |
| CN | 104882691 | A | 9/2015 |
| CN | 105428860 | A | 3/2016 |
| CN | 105789963 | A | 7/2016 |
| CN | 106981762 | A | 7/2017 |
| CN | 107658593 | A | 2/2018 |
| CN | 108493716 | A | 9/2018 |
| CN | 207938913 | U | 10/2018 |
| CN | 108832338 | A | 11/2018 |
| CN | 208062264 | U | 11/2018 |
| CN | 208299135 | U | 12/2018 |
| CN | 110061391 | A | 7/2019 |
| CN | 209592385 | U | 11/2019 |
| CN | 110752486 | A | 2/2020 |
| CN | 111048925 | A | 4/2020 |
| CN | 210430167 | U | 4/2020 |
| CN | 111106478 | A | 5/2020 |
| CN | 107026350 | B | 7/2020 |
| CN | 111641067 | A | 9/2020 |
| CN | 111682366 | A | 9/2020 |
| CN | 111864476 | A | 10/2020 |
| CN | 211957991 | U | 11/2020 |
| CN | 112038803 | A | 12/2020 |
| CN | 112117604 | A | 12/2020 |
| CN | 212412336 | U | 1/2021 |
| CN | 212725822 | U | 3/2021 |
| CN | 213151158 | U | 5/2021 |
| CN | 112886340 | A | 6/2021 |
| CN | 214100121 | U | 8/2021 |
| CN | 214478000 | U | 10/2021 |
| CN | 214478259 | U | 10/2021 |
| CN | 113629429 | A | 11/2021 |
| CN | 215579364 | U | 1/2022 |
| CN | 216120839 | U | 3/2022 |
| CN | 114784552 | A | 7/2022 |
| CN | 217239821 | U | 8/2022 |
| CN | 115117696 | A | 9/2022 |
| CN | 218123877 | U | 12/2022 |
| CN | 115764382 | A | 3/2023 |
| CN | 218677857 | U | 3/2023 |
| CN | 116207537 | A1 | 6/2023 |

(56) References Cited

FOREIGN PATENT DOCUMENTS

| | | | |
|---|---|---|---|
| CN | 219436197 | U | 7/2023 |
| CN | 116526192 | A | 8/2023 |
| CN | 116544691 | A | 8/2023 |
| CN | 116667063 | A | 8/2023 |
| CN | 220673019 | U | 3/2024 |
| EP | 0436943 | A1 | 7/1991 |
| JP | 2000-67958 | A | 3/2000 |
| JP | 2005-123163 | A | 5/2005 |
| JP | 3154945 | U | 10/2009 |
| JP | 2019-185880 | A | 10/2019 |
| JP | 3238050 | U | 6/2022 |
| KR | 2001-0082007 | A | 8/2001 |
| TW | M253973 | U | 12/2004 |
| TW | 200627723 | A | 8/2006 |
| TW | M531081 | U | 10/2016 |
| TW | M572092 | U | 12/2018 |
| TW | M601917 | U | 9/2020 |
| TW | I759140 | B | 3/2022 |
| TW | M629001 | U | 7/2022 |
| TW | M638656 | U | 3/2023 |
| TW | M643642 | U | 7/2023 |
| WO | WO 2022/171008 | A1 | 8/2022 |
| WO | WO 2023/119057 | A1 | 6/2023 |

OTHER PUBLICATIONS

U.S. Office Action for U.S. Appl. No. 18/532,101, dated Dec. 31, 2025.

U.S. Notice of Allowance for U.S. Appl. No. 18/532,315, dated Mar. 10, 2026.

U.S. Office Action for U.S. Appl. No. 18/531,326, dated Mar. 16, 2026.

NPL_USOA_18530656_dated_Mar. 24, 2026.

NPL_USOA_18532350_dated_Mar. 25, 2026.

NPL_USOA_18532495_dated_Mar. 25, 2026.

U.S. Notice of Allowance for U.S. Appl. No. 18/532,782, dated Apr. 10, 2026.

U.S. Office Action for U.S. Appl. No. 18/532,081, dated Apr. 21, 2026.

* cited by examiner

ELECTRICAL CONNECTOR WITH IMPROVED SHIELDING OF CONDUCTIVE TERMINALS

CROSS-REFERENCE TO RELATED APPLICATION

This patent application claims priority of a Chinese Patent Application No. 202311286913.X, filed on Sep. 28, 2023 and titled "ELECTRICAL CONNECTOR", the entire content of which is incorporated herein by reference.

TECHNICAL FIELD

The present disclosure relates to an electrical connector, which belongs to the technical field of connectors.

BACKGROUND

An electrical connector in the related art includes an insulating housing, a plurality of conductive terminals mounted to the insulating housing, and a metal shell enclosing the insulating housing. Each conductive terminal usually includes a first fixing portion fixed to the insulating housing, a first elastic arm extending from one end of the first fixing portion, and a second fixing portion bent from the other end of the first fixing portion.

How to shield the second fixing portion is a technical problem to be solved by those skilled in the art.

SUMMARY

An object of the present disclosure is to provide an electrical connector capable of improving shielding of conductive terminals.

In order to achieve the above object, the present disclosure adopts the following technical solution: an electrical connector, including: a housing, the housing including a receiving slot configured to at least partially receive a mating module along a first direction, a first terminal module installation slot communicating with the receiving slot, and a second terminal module installation slot communicating with the receiving slot; a first terminal module, the first terminal module being partially received in the first terminal module installation slot; the first terminal module including a plurality of first conductive terminals; each first conductive terminal including a first fixing portion and a second fixing portion connected to the first fixing portion; a second terminal module, the second terminal module being partially received in the second terminal module installation slot; the second terminal module including a plurality of second conductive terminals; each second conductive terminal including a third fixing portion and a fourth fixing portion connected to the third fixing portion; and a mounting block, the mounting block being mounted to the housing; the mounting block including a base and a convex block protruding from the base; the base defining a first receiving groove located on one side of the convex block and extending through the base; the base further defining a second receiving groove located on another side of the convex block and extending through the base; wherein the first fixing portion is at least partially located in the first terminal module installation slot; the second fixing portion is at least partially located in the first receiving groove; the third fixing portion is at least partially located in the second terminal module installation slot; the fourth fixing portion is at least partially located in the second receiving groove; the convex block is located between the second fixing portion and the fourth fixing portion; the mounting block is a metal housing or a composite housing formed by electroplating a metal material on an insulating material; neither the first conductive terminals nor the second conductive terminals are in contact with the mounting block.

In order to achieve the above object, the present disclosure adopts the following technical solution; an electrical connector, including; a conductive housing, the conductive housing including a receiving slot configured to at least partially receive a mating module along a first direction, a first terminal module installation slot communicating with the receiving slot, and a second terminal module installation slot communicating with the receiving slot; a first terminal module, the first terminal module being partially received in the first terminal module installation slot; the first terminal module including a plurality of first conductive terminals; each first conductive terminal including a first fixing portion and a second fixing portion connected to the first fixing portion; a second terminal module, the second terminal module being partially received in the second terminal module installation slot; the second terminal module including a plurality of second conductive terminals; each second conductive terminal including a third fixing portion and a fourth fixing portion connected to the third fixing portion; and a mounting block, the mounting block being mounted to the conductive housing; the mounting block including a base and a convex block protruding from the base; the base defining a first receiving groove located on one side of the convex block and extending through the base; the base further defining a second receiving groove located on another side of the convex block and extending through the base; wherein the first fixing portion is at least partially located in the first terminal module installation slot; the second fixing portion is at least partially located in the first receiving groove; the third fixing portion is at least partially located in the second terminal module installation slot; the fourth fixing portion is at least partially located in the second receiving groove; the convex block is located between the second fixing portion and the fourth fixing portion; and wherein the mounting block is a metal housing or a composite housing formed by electroplating a metal material on an insulating material; the mounting block is in contact with the conductive housing; neither the first conductive terminals nor the second conductive terminals are in contact with the mounting block.

Compared with the prior art, the present disclosure is provided with the mounting block mounted to the housing. The mounting block includes the base and the convex block protruding from the base. The base includes the first receiving groove located on one side of the convex block and extending through the base. The base further includes the second receiving groove located on the other side of the convex block and extending through the base. The second fixing portion is at least partially located in the first receiving groove. The fourth fixing portion is at least partially located in the second receiving groove. The convex block is located between the second fixing portion and the fourth fixing portion. The mounting block is a metal shell or a composite shell formed by electroplating an metal material on an insulating material. Neither the first conductive terminal nor the second conductive terminal is in contact with the mounting block. By providing the mounting block, the second fixing portion and the fourth fixing portion can be shielded, thereby improving the shielding effect on the conductive terminals.

DETAILED DESCRIPTION

Figure 1:
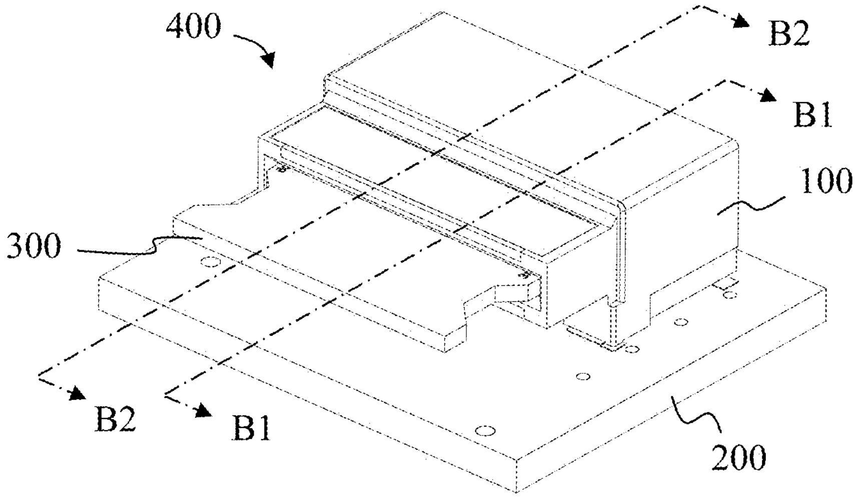
FIG. 1 is a perspective schematic view of a connector assembly in accordance with an embodiment of the present disclosure.
Figure 2:
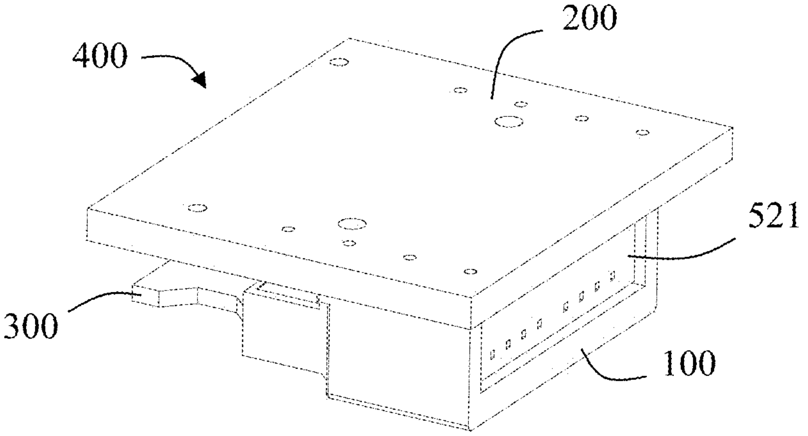
FIG. 2 is a perspective view of FIG. 1 from another angle.

Exemplary embodiments will be described in detail here, examples of which are shown in drawings. When referring to the drawings below; unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 4, the present disclosure discloses a connector assembly 400 including an electrical connector 100, a circuit board 200 for mounting the electrical connector 100, and a mating module 300 configured to be at least partially inserted into the electrical connector 100. In the illustrated embodiment of the present disclosure, the electrical connector 100 is an OSFP (Octal Small Form-factor Pluggable) receptacle connector. Correspondingly, the mating module 300 is an OSFP plug connector. Of course, it is understandable to those skilled in the art that the electrical connector 100 can also be an SFP (Small Form-factor Pluggable) receptacle connector, a QSFP (Quad Small Form-factor Pluggable) receptacle connector, a QSFP-DD (Quad Small Form-factor Pluggable-Double Density) receptacle connector, an SFP-DD (Small Form-factor Pluggable-Double Density) receptacle connector or a DSFP (Dual Chanel Small Form-factor Pluggable) receptacle connector, etc. Correspondingly, the mating module 300 is an SFP plug connector, a QSFP plug connector, a QSFP-DD plug connector, an SFP-DD plug connector or a DSFP plug connector, etc. It is understandable to those skilled in the art that the basic structure of the above types of the electrical connectors is regulated by corresponding association standards, and will not be described in detail here.

Figure 3:
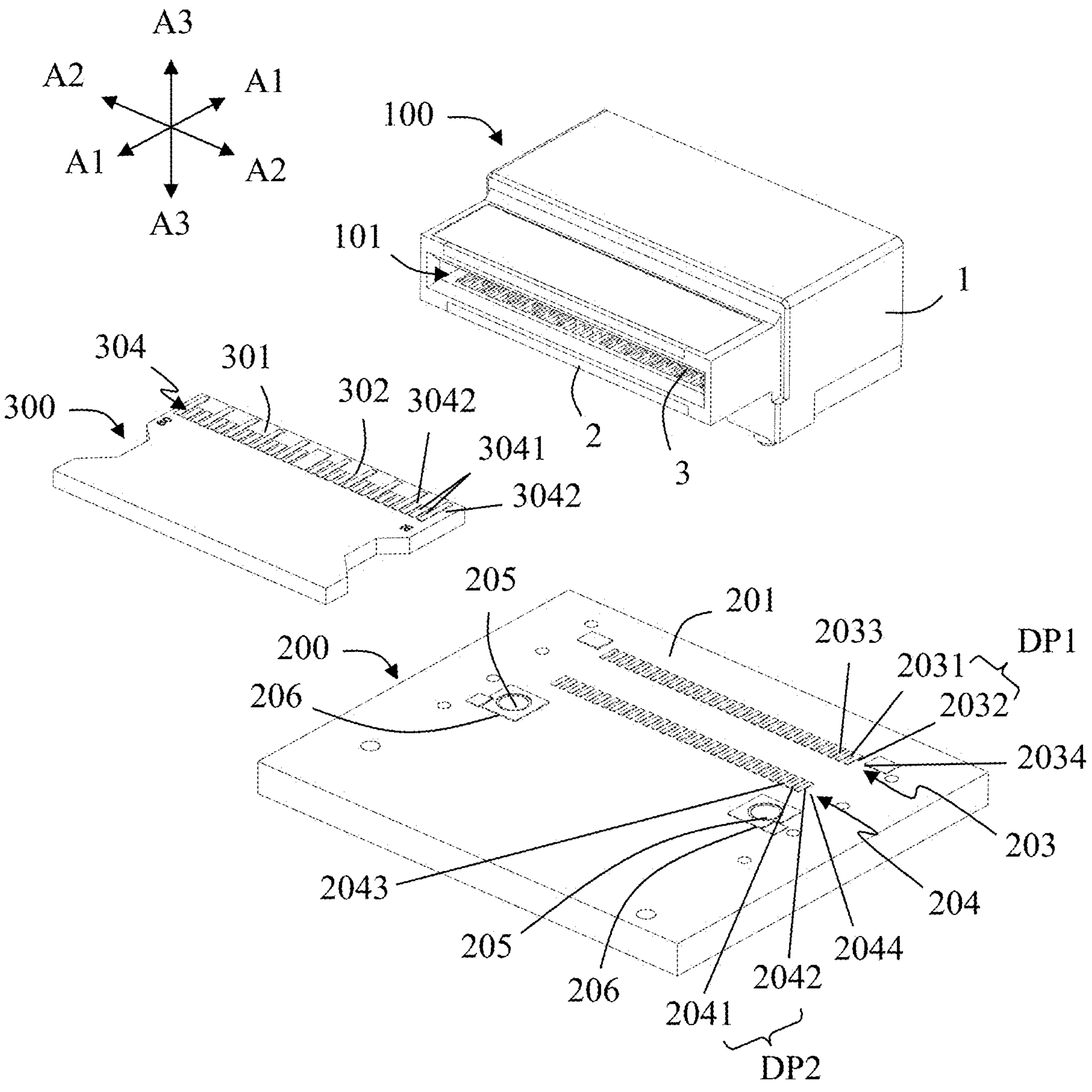
FIG. 3 is a partially exploded perspective view of FIG. 1.

Referring to FIG. 3, in the illustrated embodiment of the present disclosure, the electrical connector 100 defines a receiving slot 101 for at least partially receiving the mating module 300. To simplify the description of the specific embodiments of the present disclosure, an insertion and extraction direction of the mating module 300 and the electrical connector 100 is a first direction A1-A1 (for example, a front-rear direction); a width direction of the receiving slot 101 is a second direction A2-A2 (for example, a left-right direction); an installation direction of the electrical connector 100 and the circuit board 200 is a third direction A3-A3 (for example, a top-bottom direction). Each two of the first direction A1-A1, the second direction A2-A2 and the third direction A3-A3 are perpendicular to each other.

Figure 4:
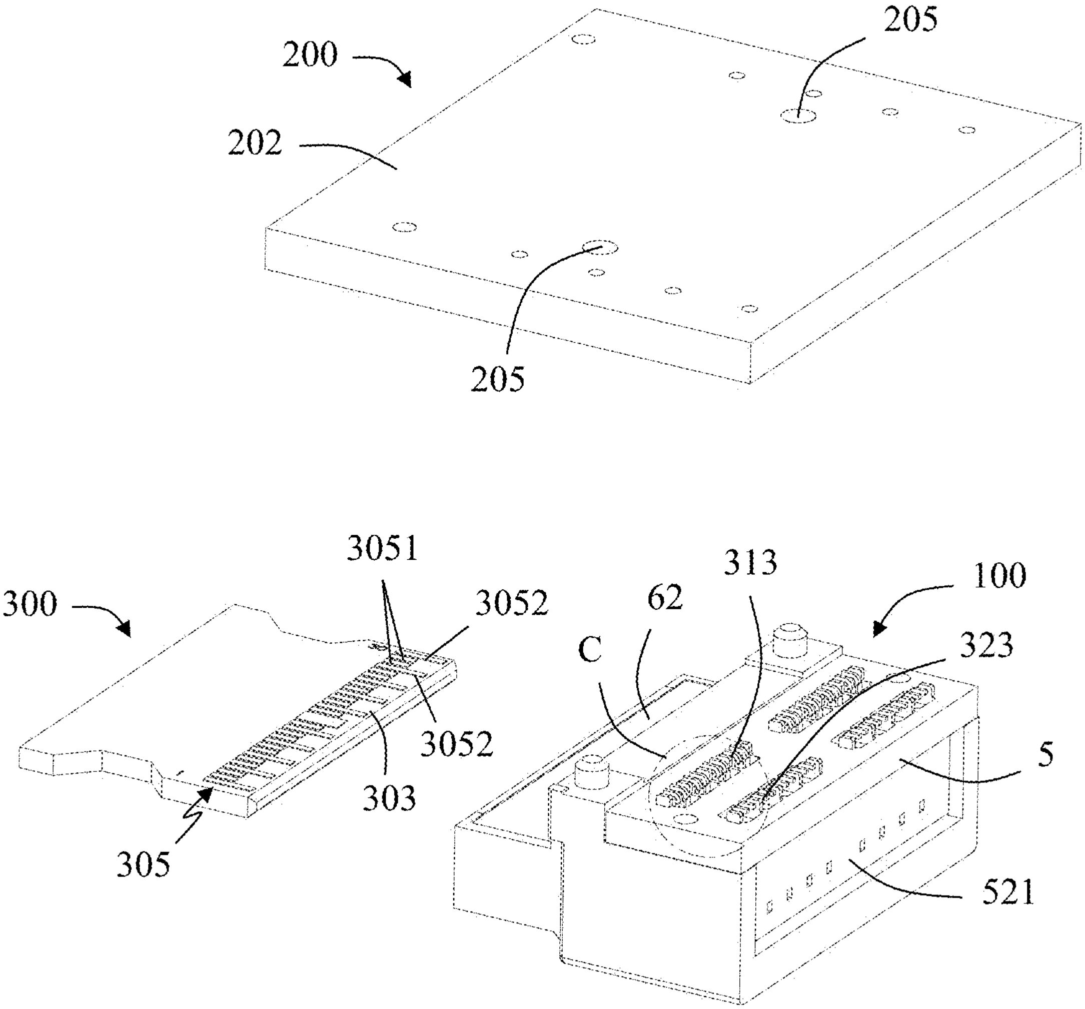
FIG. 4 is a partially exploded perspective view of FIG. 3 from another angle.

As shown in FIG. 3 and FIG. 4, the mating module 300 includes a tongue plate 301. The tongue plate 301 includes a tongue plate upper surface 302, a tongue plate lower surface 303, a plurality of first contact pads 304 exposed to the tongue plate upper surface 302, and a plurality of second contact pads 305 exposed to the tongue plate lower surface 303. The plurality of first contact pads 304 are disposed at intervals along the second direction A2-A2. The plurality of second contact pads 305 are disposed at intervals along the second direction A2-A2.

Specifically, in the illustrated embodiment of the present disclosure, the plurality of first contact pads 304 include a plurality of first signal contact pads 3041 and a plurality of first ground contact pads 3042. The plurality of first signal contact pads 3041 are divided into a plurality of groups, in which each group includes two first signal contact pads 3041 adjacently arranged along the second direction A2-A2. Each group of first signal contact pads 3041 is associated with two first ground contact pads 3042 which are located on two sides thereof respectively, so as to improve shielding and improve signal transmission quality. In the illustrated embodiment of the present disclosure, each group of first signal contact pads 3041 forms a differential pair to increase the speed of signal transmission. In the illustrated embodiment of the present disclosure, a length of each first ground contact pad 3042 along the first direction A1-A1 is greater than a length of each first signal contact pad 3041 along the first direction A1-A1, so as to better improve the shielding and improve the signal transmission quality.

Similarly, in the illustrated embodiment of the present disclosure, the plurality of second contact pads 305 include a plurality of second signal contact pads 3051 and a plurality of second ground contact pads 3052. The plurality of second signal contact pads 3051 are divided into a plurality of groups, in which each group includes two second signal contact pads 3051 adjacently arranged along the second direction A2-A2. Each group of second signal contact pads 3051 is associated with two second ground contact pads 3052 which are located on two sides thereof respectively, so as to improve shielding and improve signal transmission quality. In the illustrated embodiment of the present disclosure, each group of second signal contact pads 3051 forms a differential pair to increase the speed of signal transmission. In the illustrated embodiment of the present disclosure, a length of each second ground contact pad 3052 along the first direction A1-A1 is greater than a length of each second signal contact pad 3051 along the first direction A1-A1, so as to better improve the shielding and improve the signal transmission quality.

Referring to FIG. 3 and FIG. 4, in one embodiment of the present disclosure, the circuit board 200 includes a circuit board upper surface 201, a circuit board lower surface 202, a plurality of first conductive areas and a plurality of second conductive areas. The plurality of first conductive areas include a plurality of first signal conductive areas, a plurality of second signal conductive areas, a plurality of first ground conductive areas and a plurality of second ground conductive areas. Adjacent first signal conductive area and second signal conductive area along the second direction A2-A2 form a first signal conductive area group. In an embodiment of the present disclosure, the first signal conductive area group is a differential pair to increase the speed of signal transmission. Along the second direction A2-A2, each first signal conductive area group associated with one first ground conductive area and one second ground conductive area which are located on two sides thereof respectively, so as to improve the shielding and improve the signal transmission quality.

In one embodiment of the present disclosure, the plurality of first conductive areas are a plurality of first conductive pads 203; and the plurality of second conductive areas are a plurality of second conductive pads 204. The plurality of first conductive pads 203 and the plurality of second conductive pads 204 are configured to be electrically connected to corresponding conductive terminals of the electrical connector 100 by surface mounted technology (SMT). The plurality of first conductive pads 203 are exposed to the circuit board upper surface 201 and are disposed at intervals along the second direction A2-A2. The plurality of second conductive pads 204 are exposed to the circuit board upper surface 201 and are disposed at intervals along the second direction A2-A2. The plurality of first conductive pads 203 and the plurality of second conductive pads 204 are generally disposed in two rows along the first direction A1-A1.

The plurality of first conductive pads 203 include a plurality of first signal conductive pads 2031, a plurality of second signal conductive pads 2032, a plurality of first ground conductive pads 2033, and a plurality of second ground conductive pads 2034. Adjacent first signal conductive pad 2031 and second signal conductive pad 2032 adjacent along the second direction A2-A2 form a first signal conductive pad group DP1. In an embodiment of the present disclosure, the first signal conductive pad group DP1 is a differential pair to increase the speed of signal transmission. Along the second direction A2-A2, each first signal conductive pad group DP1 is associated with one first ground conductive pad 2033 and one second ground conductive pad 2034 which are located on two sides thereof, respectively, so as to improve shielding and improve signal transmission quality.

Referring to FIG. 3, in the illustrated embodiment of the present disclosure, the plurality of second conductive pads 204 include a plurality of third signal conductive pads 2041, a plurality of fourth signal conductive pads 2042, a plurality of third ground conductive pads 2043 and a plurality of fourth ground conductive pads 2044. Adjacent third signal conductive pad 2041 and the fourth signal conductive pad 2042 along the second direction A2-A2 form a second signal conductive pad group DP2. In an embodiment of the present disclosure, the second signal conductive pad group DP2 is a differential pair to increase the speed of signal transmission. Along the second direction A2-A2, each second signal conductive pad group DP2 is associated with one third ground conductive pad 2043 and one fourth ground conductive pad 2044 which are located on two sides thereof respectively, so as to improve shielding and improve signal transmission quality.

In another embodiment of the present disclosure, the plurality of first conductive areas are a plurality of first through holes; and the plurality of second conductive areas are a plurality of second through holes. In other words, the first conductive pads 203 and the second conductive pads 204 of the circuit board 200 in the first embodiment are replaced by the first through holes and the second through holes. The plurality of first through holes and the plurality of second through holes extend through the circuit board upper surface 201 and the circuit board lower surface 202 along the third direction A3-A3. The plurality of first through holes and the plurality of second through holes are configured to allow corresponding conductive terminals of the electrical connector 100 to be at least partially inserted to achieve electrical connection. In one embodiment, the corresponding conductive terminals of the electrical connector 100 extend through the first through holes and the second through holes, and are electrically connected to the circuit board 200 by through hole welding or soldering. At this time, the first signal conductive pad 2031 is replaced by a first signal through hole; the second signal conductive pad 2032 is replaced by a second signal through hole; the first ground conductive pad 2033 is replaced by a first ground through hole; and the second ground conductive pad 2034 is replaced by a second ground through hole.

In another embodiment, the first through holes and the second through holes are first conductive through holes and second conductive through holes, respectively. That is, the first signal conductive pad 2031 is replaced by a first signal conductive through hole; the second signal conductive pad 2032 is replaced by a second signal conductive through hole; the first ground conductive pad 2033 is replaced by a first ground conductive through hole; and the second ground conductive pad 2034 is replaced by a second ground conductive through hole. The corresponding conductive terminals of the electrical connector 100 are at least partially pressed into the first conductive through holes and the second conductive through holes, and the electrical connection between the conductive terminals and the conductive through holes is achieved by press-fitting.

Referring to FIG. 3 and FIG. 4, in the illustrated embodiment of the present disclosure, the circuit board 200 further includes a plurality of mounting through holes 205 extending through the circuit board upper surface 201 and the circuit board lower surface 202, and a plurality of ground fixing pads 206 exposed to the circuit board upper surface 201. The ground fixing pads 206 are disposed around corresponding mounting through holes 205. The mounting through holes 205 are configured to position the electrical connector 100. The ground fixing pads 206 are configured to contact the electrical connector 100 so to better achieve grounding and/or fixation. In one embodiment of the present disclosure, the ground fixing pads 206 are welded or soldered to corresponding parts of the electrical connector 100, thereby achieving the grounding function, and increasing the bonding force between the electrical connector 100 and the circuit board 200. In one embodiment of the present disclosure, the plurality of ground fixing pads 206 are connected as a whole through internal conductive traces of the circuit board 200 to increase the grounding area.

Referring to FIGS. 5 to 23, in one embodiment of the present disclosure, the electrical connector 100 includes a housing, an insulating fixing block 2 fixed to the housing, and a plurality of conductive terminals 3 installed to the housing.

In an embodiment of the present disclosure, the housing is a conductive housing 1. The conductive housing 1 is a metal housing made of metal material so as to further improve the shielding effect and improve the quality of signal transmission. In another embodiment of the present disclosure, the conductive housing 1 may also be a composite housing formed by electroplating a metal material on an insulating material. The composite housing can also improve the shielding effect and improve the quality of signal transmission.

Figure 14:
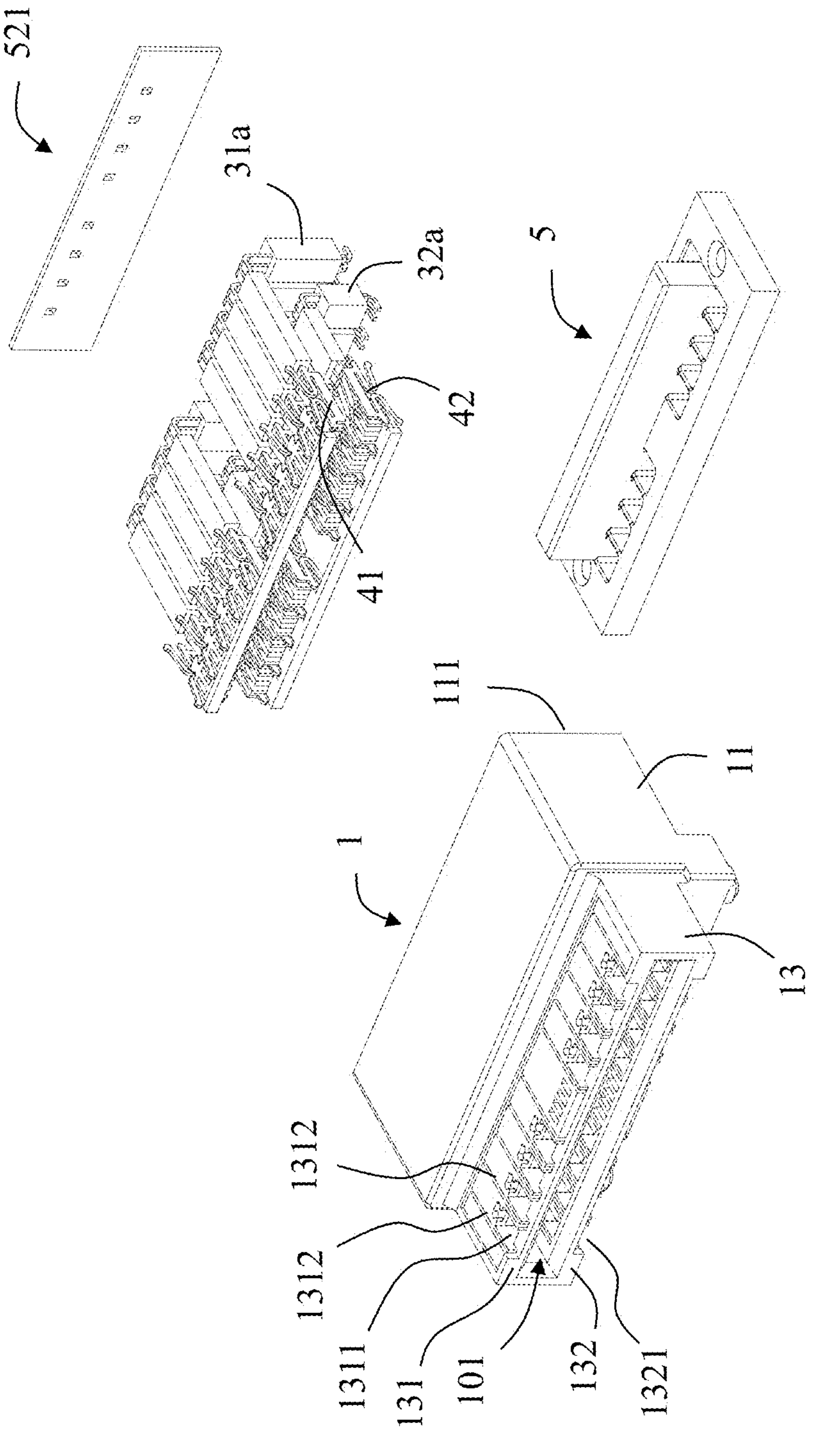
FIG. 14 is a further partially exploded perspective view of FIG. 12.
Figure 15:
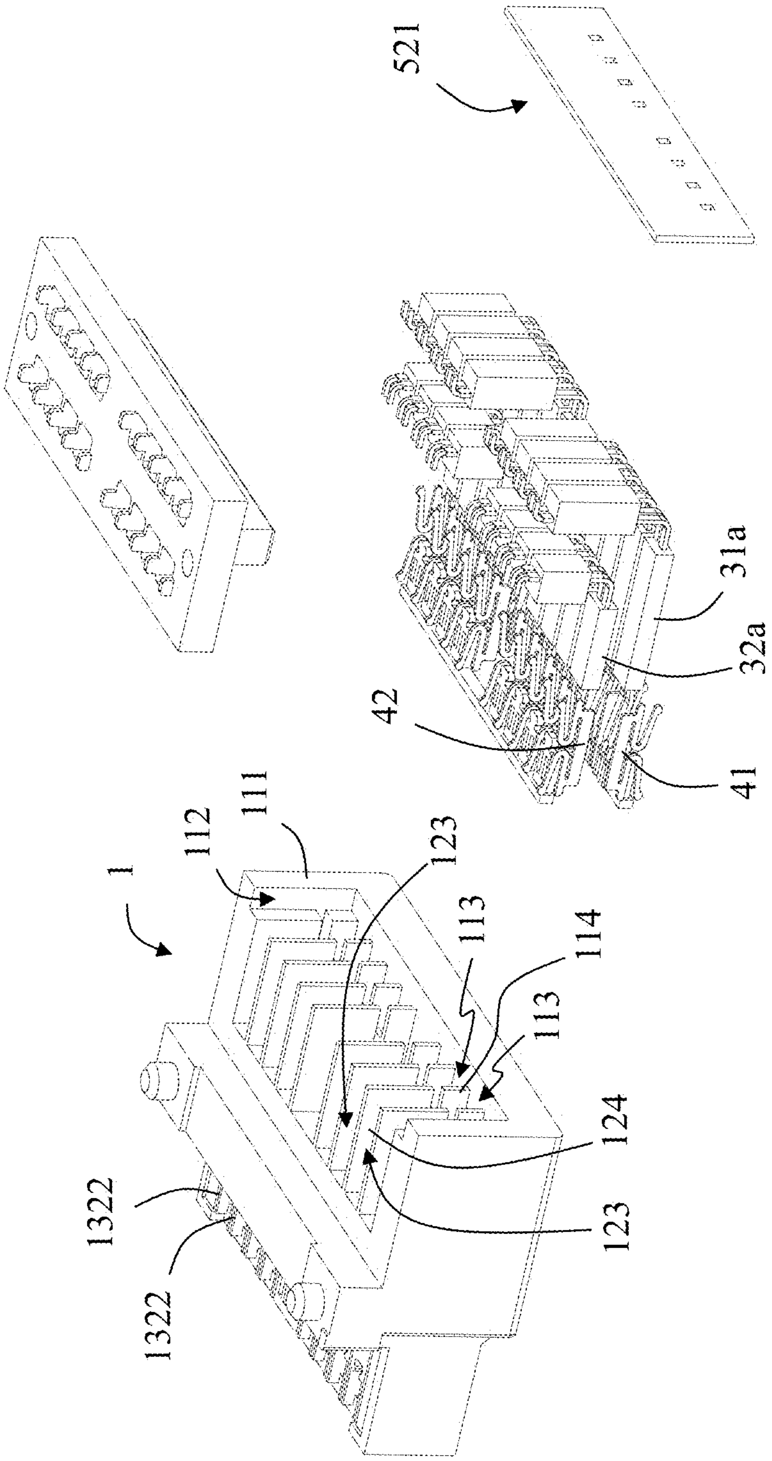
FIG. 15 is a partially exploded perspective view of FIG. 14 from another angle.
Figure 16:
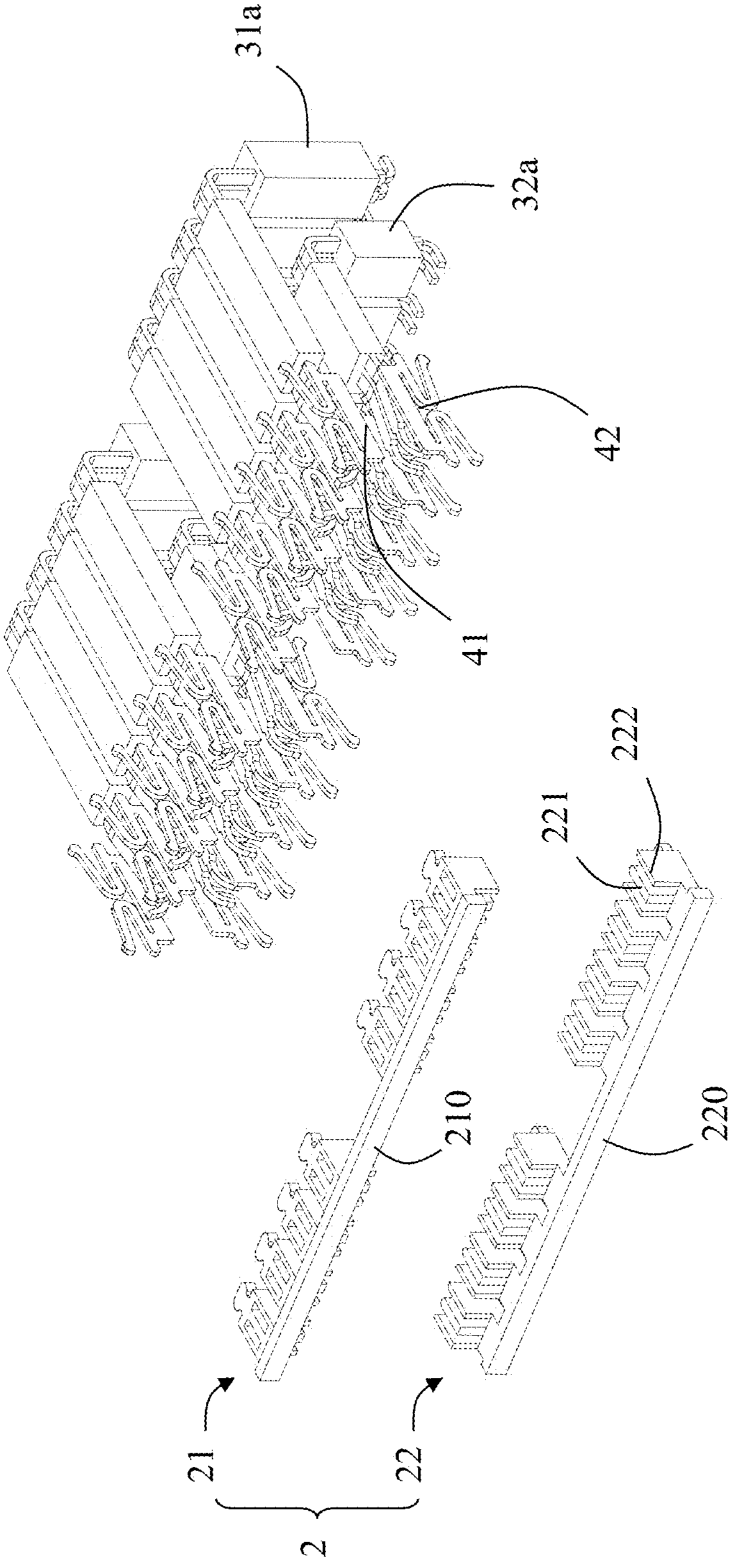
FIG. 16 is an exploded perspective view of a first insulating fixing block, a second insulating fixing block, a first terminal module and a second terminal module in FIG. 14.
Figure 17:
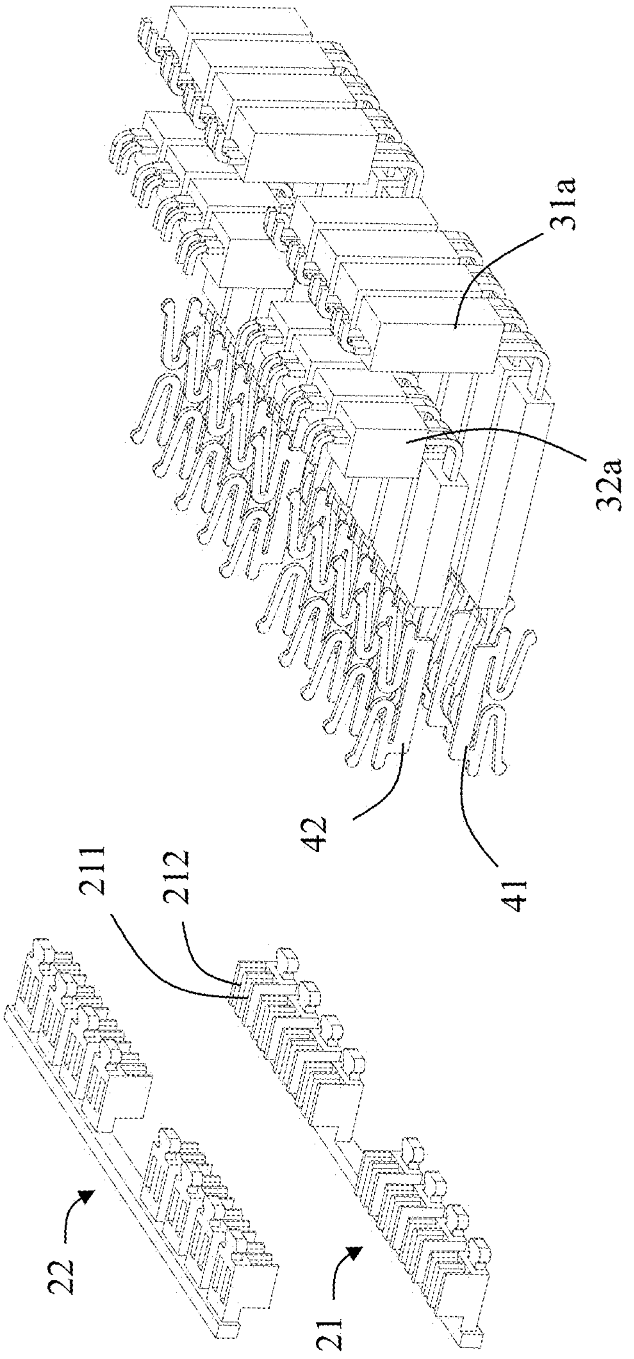
FIG. 17 is an exploded perspective view of FIG. 16 from another angle.

Referring to FIG. 14 and FIG. 15, in one embodiment of the present disclosure, the conductive housing 1 includes a base portion 11 and a protruding portion 13 protruding forwardly from the base portion 11. The base portion 11 includes a rear end surface 111, a back plate mounting groove 112 recessed forwardly from the rear end surface 111, a plurality of first terminal module installation slots 113 extending through the base portion 11 along the first direction A1-A1, and a plurality of second terminal module installation slots 123 extending through the base portion 11 along the first direction A1-A1.

The plurality of first terminal module installation slots 113 are spaced apart along the second direction A2-A2. The base portion 11 includes a plurality of first partition walls 114 spaced apart along the second direction A2-A2. Two adjacent first terminal module installation slots 113 are separated by a corresponding first partition wall 114 along the second direction A2-A2. With this arrangement, each first terminal module installation slot 113 is relatively independent, thereby reducing signal crosstalk and improving the quality of data transmission.

The plurality of second terminal module installation slots 123 are spaced apart along the second direction A2-A2. The base portion 11 includes a plurality of second partition walls 124 spaced apart along the second direction A2-A2. Two adjacent second terminal module installation slots 123 are separated by a corresponding second partition wall 124 along the second direction A2-A2. With this arrangement, each second terminal module installation slot 123 is relatively independent, thereby reducing signal crosstalk and improving the quality of data transmission.

The protruding portion 13 includes a top wall 131 and a bottom wall 132. The receiving slot 101 is located at least between the top wall 131 and the bottom wall 132. The top wall 131 defines a plurality of first filling grooves 1311 extending through the top wall 131 along the third direction A3-A3. The plurality of first filling grooves 1311 are in communication with the receiving slot 101. Similarly, the bottom wall 132 defines a plurality of second filling grooves 1321 extending through the bottom wall 132 along the third direction A3-A3. The plurality of second filling grooves 1321 are in communication with the receiving slot 101. In addition, the top wall 131 defines a plurality of first terminal installation slots 1312 extending through the top wall 131 along the third direction A3-A3. The plurality of first terminal installation slots 1312 are in communication with the receiving slot 101. Similarly, the bottom wall 132 defines a plurality of second terminal installation slots 1322 extending through the bottom wall 132 along the third direction A3-A3. The plurality of second terminal installation slots 1322 are in communication with the receiving slot 101.

Referring to FIG. 13 to FIG. 23, in the illustrated embodiment of the present disclosure, the insulating fixing block 2 includes a first insulating fixing block 21 and a second insulating fixing block 22. The first insulating fixing block 21 is fixed in the first filling grooves 1311. The second insulating fixing block 22 is fixed in the second filling grooves 1321. Preferably, in order to increase the bonding force between the first insulating fixing block 21 and the conductive housing 1, the first insulating fixing block 21 is over-molded in the first filling grooves 1311. Similarly, in order to increase the bonding force between the second insulating fixing block 22 and the conductive housing 1, the second insulating fixing block 22 is over-molded in the second filling grooves 1321.

The first insulating fixing block 21 defines a plurality of first slits 211 and a plurality of second slits 212, in which adjacent first slit 211 and second slit 212 form a group and communicate with a corresponding first terminal module installation slot 113. The first insulating fixing block 21 further includes a first front surface 210 which is coplanar with a front end surface 130 of the protruding portion 13.

Similarly, the second insulating fixing block 22 defines a plurality of third slits 221 and a plurality of fourth slits 222, in which adjacent third slit 221 and fourth slit 222 form a group and communicate with a corresponding second terminal module installation slot 123. The second insulating fixing block 22 includes a second front surface 220 which is coplanar with the front end surface 130 of the protruding portion 13.

Figure 18:
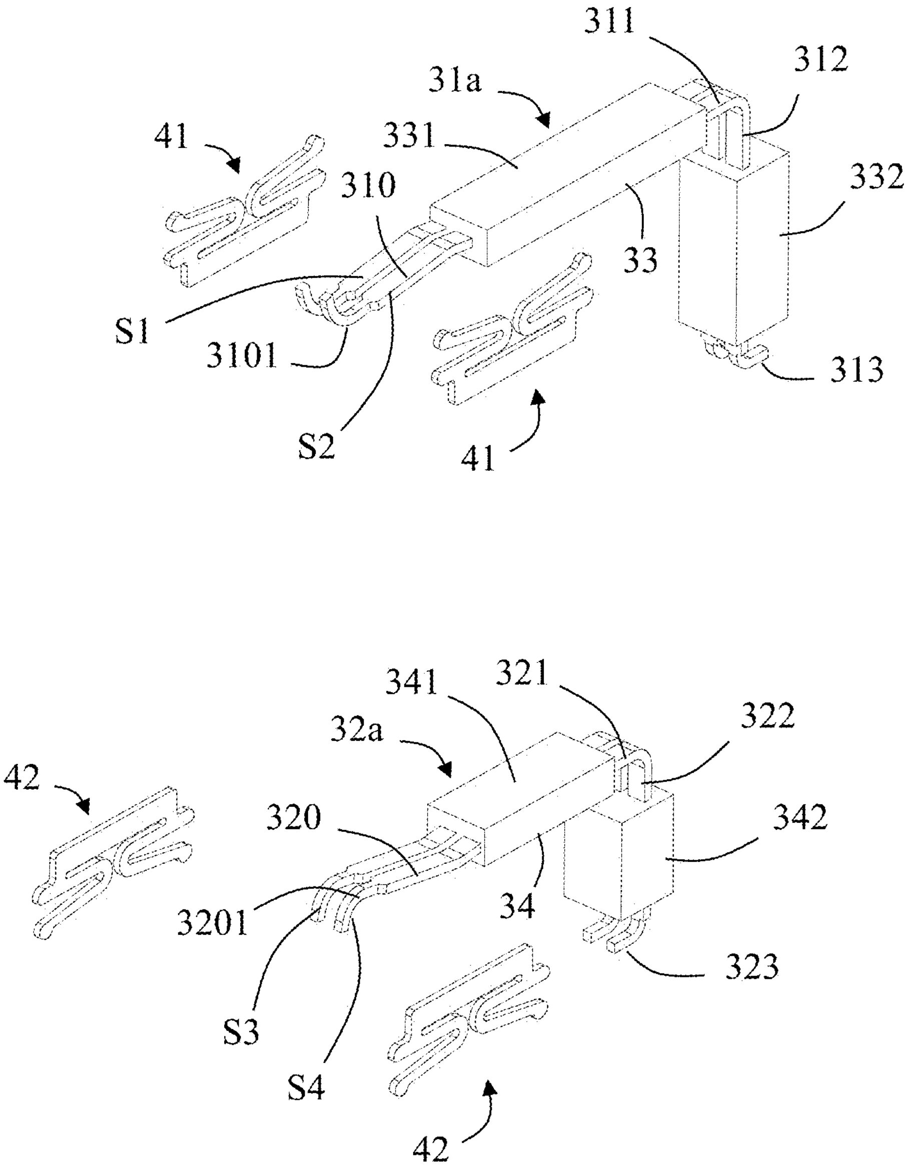
FIG. 18 is a perspective view of a plurality of first ground terminals, the first terminal module, a plurality of second ground terminal and the second terminal module.
Figure 19:
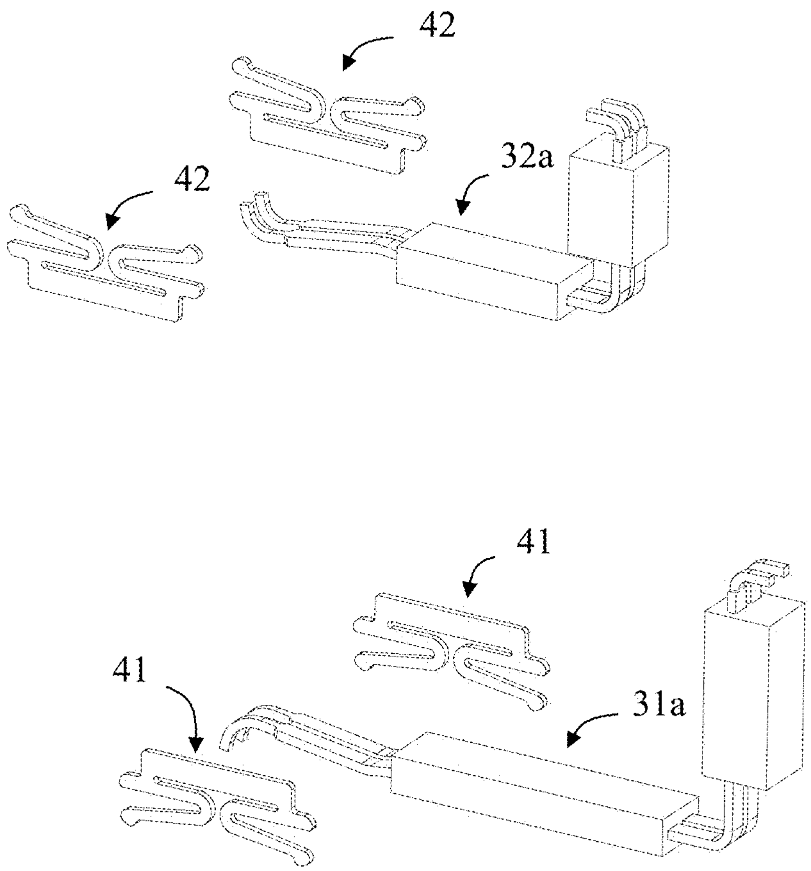
FIG. 19 is a perspective view of FIG. 18 from another angle.
Figure 20:
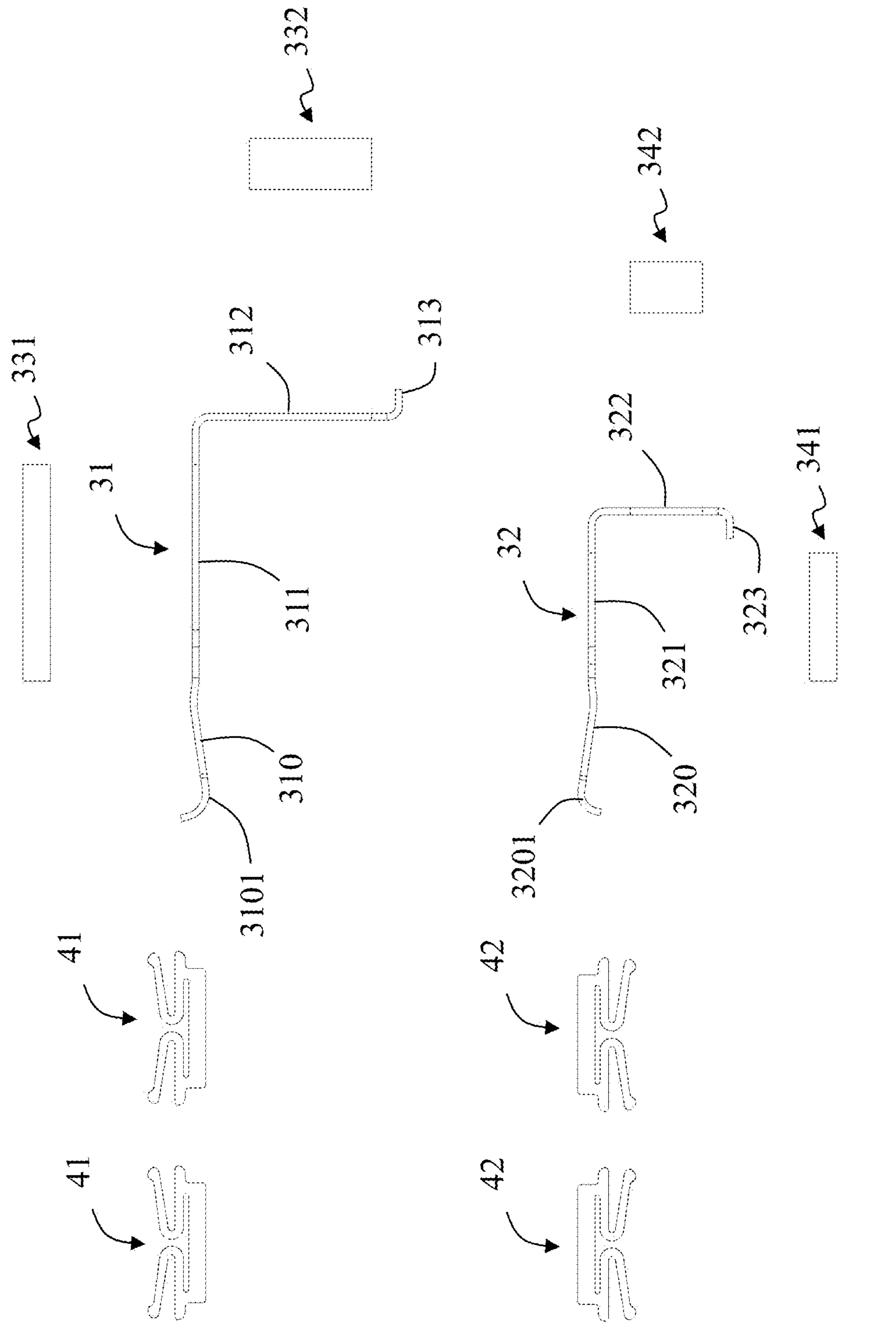
FIG. 20 is an exploded side view of the first ground terminal, the first terminal module, the second ground terminal and the second terminal module.

As shown in FIG. 18 to FIG. 20, the plurality of conductive terminals 3 include a plurality of first conductive terminals 31 and a plurality of second conductive terminals 32. Each first conductive terminal 31 includes a first fixing portion 311 extending along the first direction A1-A1, a first contact arm 310 extending forwardly from a front end of the first fixing portion 311, a second fixing portion 312 bent downwardly from a rear end of the first fixing portion 311, and a first mounting foot 313 extending from a bottom end of the second fixing portion 312. The first contact arm 310 includes a first contact portion 3101 that protrudes into the receiving slot 101 to contact the first signal contact pad 3041 of the tongue plate 301. In the illustrated embodiment of the present disclosure, the first mounting foot 313 horizontally extends backwardly from the bottom end of the second fixing portion 312, so as to be in contact with a corresponding first signal conductive pad 2031 and a corresponding second signal conductive pad 2032 of the circuit board 200. It is understandable to those skilled in the art that in the illustrated embodiment of the present disclosure, the first mounting feet 313 may be fixed to the corresponding first signal conductive pad 2031 and the corresponding second signal conductive pad 2032 of the circuit board 200 through SMT. Of course, in other embodiments, the first mounting feet 313 may also be disposed perpendicular to the circuit board 200. At this time, the circuit board 200 defines a plurality of through holes, and the first mounting feet 313 extend through the through holes to be fixed to the circuit board 200 by soldering or welding. In other embodiments, the first mounting feet 313 may also be disposed perpendicular to the circuit board 200. Each first mounting foot 313 defines a fisheye hole to provide a certain degree of elasticity. At this time, the circuit board 200 defines a plurality of conductive through holes, and the first mounting feet 313 can be fixed to the circuit board 200 through press-fit. The installation method of the first mounting feet 313 and the circuit board 200 can be understood by those skilled in the art, and will not be described in detail here.

In the illustrated embodiment of the present disclosure, the plurality of first conductive terminals 31 are divided into a plurality of groups. Each group of first conductive terminals 31 includes a first signal terminal S1 and a second signal terminal S2 located adjacent to the first signal terminal S1. Preferably, the first signal terminal S1 and the second signal terminal S2 in each group of first conductive terminals 31 form a differential pair to improve signal transmission speed.

In the illustrated embodiment of the present disclosure, the electrical connector 100 further includes a first holding block 33 fixed on the first signal terminal S1 and the second signal terminal S2 of each group of first conductive terminals 31. In an embodiment of the present disclosure, the first signal terminal S1 and the second signal terminal S2 are insert-molded with the first holding block 33, so as to form an integrated first terminal module 31*a*. The first contact portions 3101 of the first signal terminal S1 and the second signal terminal S2 in each first terminal module 31*a* are configured to be in contact with the first signal contact pads 3041 of the mating module 300, respectively. The first mounting foot 313 of the first signal terminal S1 and the first mounting foot 313 of the second signal terminal S2 in each first terminal module 31*a* are configured to be in contact with the first signal conductive pad 2031 and the second signal conductive pad 2032 of the circuit board 200, respectively. In an embodiment of the present disclosure, the first mounting foot 313 of the first signal terminal S1 and the first mounting foot 313 of the second signal terminal S2 in each first terminal module 31*a* are soldered or welded to the first signal conductive pad 2031 and the second signal conductive pad 2032 of the circuit board 200, respectively.

In the illustrated embodiment of the present disclosure, the first holding block 33 includes a first fixing block 331 fixed on the first fixing portions 311 of the first signal terminal S1 and the second signal terminal S2, and a second fixing block 332 fixed on the second fixing portions 312 of the first signal terminal S1 and the second signal terminal S2.

Similarly, each second conductive terminal 32 includes a third fixing portion 321 extending along the first direction A1-A1, a second contact arm 320 extending forwardly from a front end of the third fixing portion 321, a fourth fixing portion 322 bent downwardly from a rear end of the third fixing portion 321, and a second mounting foot 323 extending from a bottom end of the fourth fixing portion 322. The second contact arm 320 includes a second contact portion 3201 protruding into the receiving slot 101 so as to contact the second signal contact pad 3051 of the tongue plate 301. In the illustrated embodiment of the present disclosure, the second mounting foot 323 horizontally extends forwardly from the bottom end of the fourth fixing portion 322, so as to be in contact with the third signal conductive pad 2041 and the fourth signal conductive pad 2042 of the circuit board 200. It is understandable to those skilled in the art that in the illustrated embodiment of the present disclosure, the second mounting feet 323 are soldered or welded to the third signal conductive pad 2041 and the fourth signal conductive pad 2042 of the circuit board 200 by SMT. Of course, in other embodiments, the second mounting feet 323 can also be disposed perpendicular to the circuit board 200. At this time, the circuit board 200 defines a plurality of through holes, and the second mounting feet 323 pass through the through holes to be soldered or welded to the circuit board 200. In other embodiments, the second mounting feet 323 may also be disposed perpendicular to the circuit board 200. Each second mounting foot 323 defines a fisheye hole to provide a certain degree of elasticity. At this time, the circuit board 200 defines a plurality of conductive through holes. The second mounting feet 323 can be fixed to the circuit board 200 through press-fit. The installation method of the second mounting feet 323 and the circuit board 200 can be understood by those skilled in the art, and will not be described in detail here.

In the illustrated embodiment of the present disclosure, the plurality of second conductive terminals 32 are divided into a plurality of groups, and each group of second conductive terminals 32 includes a third signal terminal S3 and a fourth signal terminal S4 located adjacent to the third signal terminal S3. Preferably, the third signal terminal S3 and the fourth signal terminal S4 in each group of second conductive terminals 32 form a differential pair to improve signal transmission speed.

In the illustrated embodiment of the present disclosure, the electrical connector 100 further includes a second holding block 34 fixed on the third signal terminal S3 and the fourth signal terminal S4 of each group of second conductive terminals 32. In one embodiment of the present disclosure, the third signal terminal S3 and the fourth signal terminal S4 are insert-molded with the second holding block 34 to form an integrated second terminal module 32*a*. The second contact portions 3201 of the third signal terminal S3 and the fourth signal terminal S4 in each second terminal module 32*a* are configured to be in contact with the second signal contact pads 3051 of the mating module 300. The second mounting foot 323 of the third signal terminal S3 and the second mounting foot 323 of the fourth signal terminal S4 in each second terminal module 32*a* are in contact with a corresponding third signal conductive pad 2041 and a corresponding fourth signal conductive pad 2042 of the circuit board 200, respectively. In one embodiment of the present disclosure, the second mounting foot 323 of the third signal terminal S3 and the second mounting foot 323 of the fourth signal terminal S4 in each second terminal module 32*a* are soldered or welded to the corresponding third signal conductive pad 2041 and the corresponding fourth signal conductive pad 2042 of the circuit board 200, respectively.

In the illustrated embodiment of the present disclosure, the second holding block 34 includes a third fixing block 341 fixed on the third fixing portions 321 of the third signal terminal S3 and the fourth signal terminal S4, and a fourth fixing block 342 fixed on the fourth fixing portions 321 of the third signal terminal S3 and the fourth signal terminal S4.

As shown in FIGS. 1 to 23, in one embodiment of the present disclosure, the electrical connector 100 further includes a plurality of first ground terminals 41 installed in the plurality of first terminal installation slots 1312 and a plurality of second ground terminals 42 installed in the plurality of second terminal installation slots 1322. In the illustrated embodiment of the present disclosure, the first ground terminals 41 and the second ground terminals 42 are both made of metal material.

Figure 21:
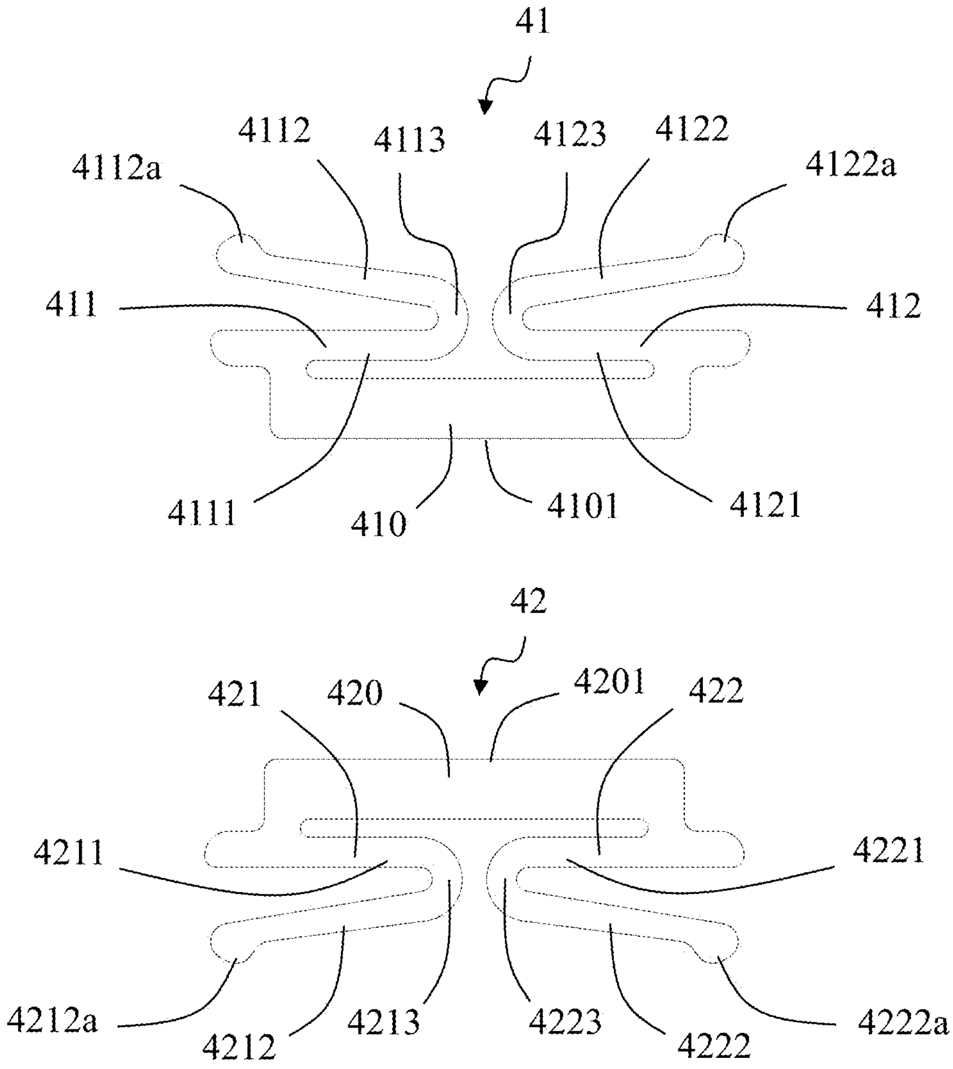
FIG. 21 is a side view of the first ground terminal and the second ground terminal in FIG. 20.

Referring to FIG. 21, each first ground terminal 41 includes a first base portion 410, a first elastic arm 411 protruding upwardly from one side of the first base portion 410, and a second elastic arm 412 protruding upwardly from another side of the first base portion 410. In the illustrated embodiment of the present disclosure, the first base portion 410 includes a first mating portion 4101 which is a lower surface of the first base portion 410. The first mating portion 4101 is configured to contact a corresponding first ground contact pad 3042 of the tongue plate 301.

In the illustrated embodiment of the present disclosure, the first elastic arm 411 is U-shaped and includes a first elastic portion 4111, a second elastic portion 4112, and a first connecting portion 4113 connecting one end of the first elastic portion 4111 and one end of the second elastic portion 4112. The first elastic portion 4111 and the second elastic portion 4112 are spaced apart along the second direction A2-A2. The first elastic portion 4111 and the first base portion 410 are spaced apart along the second direction A2-A2. A free end of the second elastic portion 4112 includes a first contact protrusion 4112*a*.

In the illustrated embodiment of the present disclosure, the second elastic arm 412 is U-shaped and includes a third elastic portion 4121, a fourth elastic portion 4122, and a second connecting portion 4123 connecting one end of the third elastic portion 4121 and one end of the fourth elastic portion 4122. The third elastic portion 4121 and the fourth elastic portion 4122 are spaced apart along the second direction A2-A2. The third elastic portion 4121 is spaced apart from the first base portion 410 along the second direction A2-A2. A free end of the fourth elastic portion 4122 includes a second contact protrusion 4122*a*. Opening directions of the first elastic arm 411 and the second elastic arm 412 are opposite to each other. In an embodiment of the present disclosure, the first elastic arm 411 and the second elastic arm 412 are arranged symmetrically.

Similarly, each second ground terminal 42 includes a second base portion 420, a third elastic arm 421 protruding upwardly from one side of the second base portion 420, and a fourth elastic arm 422 protruding upwardly from the other side of the second base portion 420. In the illustrated embodiment of the present disclosure, the second base portion 420 includes a second mating portion 4201 which is an upper surface of the second base portion 420. The second mating portion 4201 is configured to contact a corresponding second ground contact pad 3052 of the tongue plate 301.

In the illustrated embodiment of the present disclosure, the third elastic arm 421 is U-shaped and includes a fifth elastic portion 4211, a sixth elastic portion 4212, and a third connecting portion 4213 connecting one end of the fifth elastic portion 4211 and one end of the sixth elastic portion 4212. The fifth elastic portion 4211 and the sixth elastic portion 4212 are spaced apart along the second direction A2-A2. The fifth elastic portion 4211 and the second base portion 420 are spaced apart from each other along the second direction A2-A2. A free end of the sixth elastic portion 4212 includes a third contact protrusion 4212*a*.

In the illustrated embodiment of the present disclosure, the fourth elastic arm 422 is U-shaped and includes a seventh elastic portion 4221, an eighth elastic portion 4222, and a fourth connecting portion 4223 connecting one end of the seventh elastic portion 4221 and one end of the eighth elastic portion 4222. The seventh elastic portion 4221 and the eighth elastic portion 4222 are spaced apart along the second direction A2-A2. The seventh elastic portion 4221 is spaced apart from the second base portion 420 along the second direction A2-A2. A free end of the eighth elastic portion 4222 includes a fourth contact protrusion 4222*a*. Opening directions of the third elastic arm 421 and the fourth elastic arm 422 are opposite to each other. In an embodiment of the present disclosure, the third elastic arm 421 and the fourth elastic arm 422 are arranged symmetrically.

In the illustrated embodiment of the present disclosure, in order to press the first ground terminals 41 and the second ground terminals 42, the electrical connector 100 further includes a first pressing plate 61 fixed on the top wall 131 of the protruding portion 13 and a second pressing plate 62 fixed on the bottom wall 132 of the protruding portion 13. In an embodiment of the present disclosure, the first pressing plate 61 and the second pressing plate 62 are both metal plates, so that the plurality of first ground terminals 41 and the plurality of second ground terminals 42 are connected in series, thereby increasing the shielding area and improving the quality of signal transmission. In the illustrated embodiment of the present disclosure, the top wall 131 defines a first mounting groove 1313 in which the first pressing plate 61 is fixed. The bottom wall 132 defines a second mounting groove 1323 in which the second pressing plate 62 is fixed.

Specifically, in the illustrated embodiment of the present disclosure, the first contact protrusions 4112*a* and the second contact protrusions 4122*a* are pressed by a lower surface of the first pressing plate 61. The third contact protrusions 4212*a* and the fourth contact protrusions 4222*a* are pressed by an upper surface of the second pressing plate 62.

It is understandable to those skilled in the art that the first elastic arm 411 and/or the second elastic arm 412 can serve as an elastic portion of the first ground terminal 41. The elastic portion is deformable when the mating module 300 abuts against the first mating portion 4101, thereby causing the first mating portion 4101 to move upwardly along the third direction A3-A3. The third elastic arm 421 and/or the fourth elastic arm 422 can serve as a second elastic portion of the second ground terminal 42. The second elastic portion is deformable when the mating module 300 abuts against the second mating portion 4201, thereby causing the second mating portion 4201 to move downwardly along the third direction A3-A3.

Preferably; the first ground terminals 41 and the second ground terminals 42 have the same structure, so that components can be shared to reduce costs.

In the illustrated embodiment of the present disclosure, the first pressing plate 61 and the second pressing plate 62 are manufactured separately from the housing (for example, the conductive housing 1). That is, the first pressing plate 61 and the second pressing plate 62 are independent components compared to the housing. It is understandable to those skilled in the art that in other embodiments of the present disclosure, the first pressing plate 61 and/or the second pressing plate 62 are integrally formed with the housing.

Figure 12:
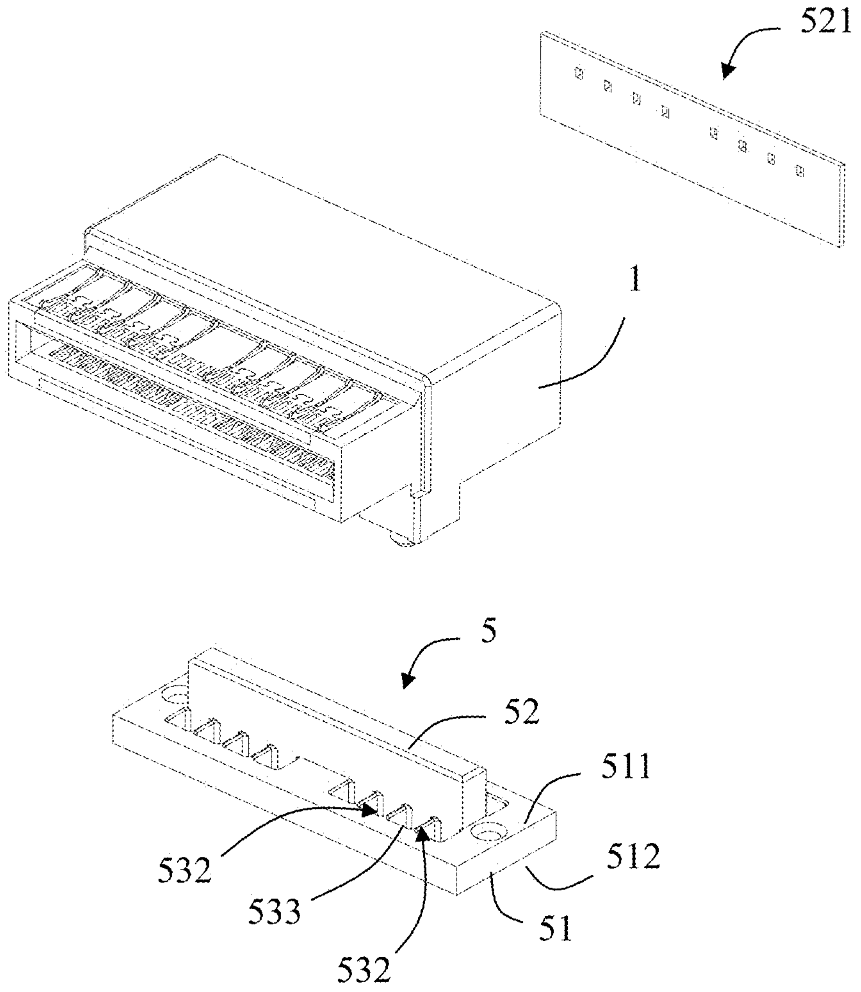
FIG. 12 is a further perspective exploded view of the electrical connector of the present disclosure after removing the first pressing plate and the second pressing plate in FIG. 6.
Figure 13:
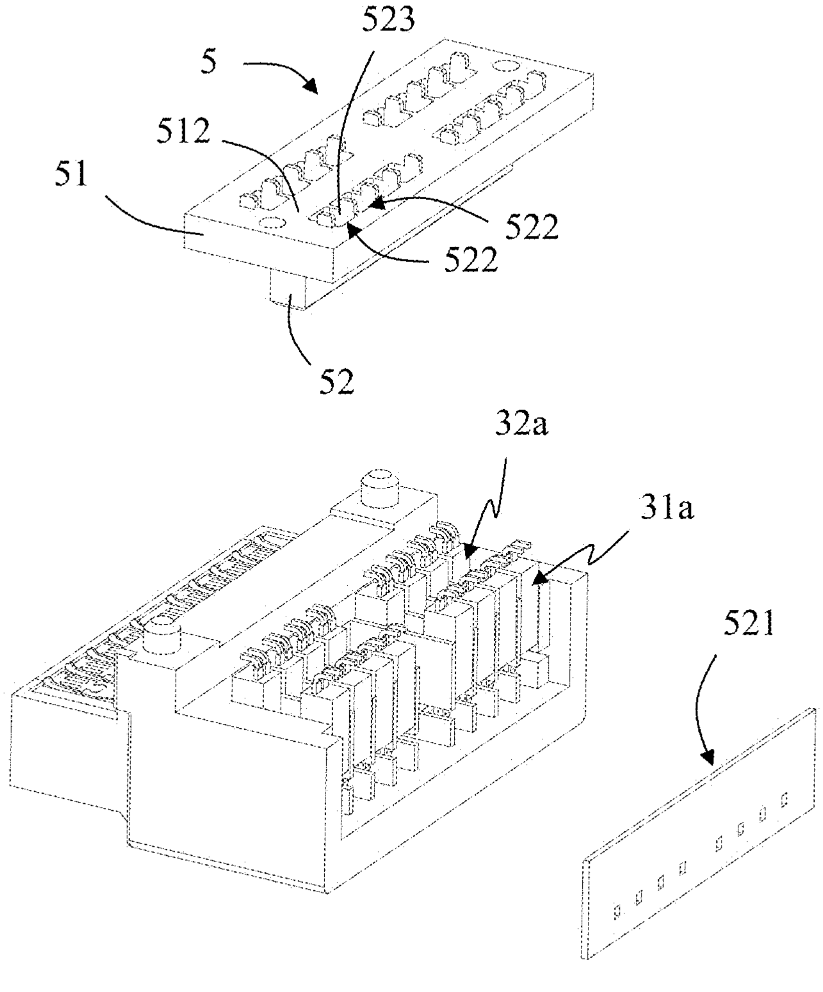
FIG. 13 is a partially exploded perspective view of FIG. 12 from another angle.

Referring to FIG. 12 and FIG. 13, in one embodiment of the present disclosure, the electrical connector 100 further includes a mounting block 5 mounted to the conductive housing 1. In one embodiment of the present disclosure, the mounting block 5 is a metal shell made of metal material so as to improve the shielding effect and improve the quality of signal transmission. In another embodiment of the present disclosure, the mounting block 5 may also be a composite shell formed by electroplating a metal material on an insulating material.

In an embodiment of the present disclosure, the mounting block 5 includes a base 51, a convex block 52 extending upwardly from a middle portion of the base 51, a plurality of first receiving grooves 522 extending through the base 51 along the third direction A3-A3, and a plurality of second receiving grooves 532 extending through the base 51 along the third direction A3-A3. The base 51 has a top surface 511 and a bottom surface 512. The convex block 52 protrude upwardly from the top surface 511 of the base 51. The first receiving grooves 522 are located on one side of the convex block 52, and the second receiving grooves 532 are located on the other side of the convex block 52. The base 51 further includes a plurality of third partition walls 523 of which each separates adjacent first receiving grooves 522, and a plurality of fourth partition walls 533 of which each separates adjacent second receiving grooves 532. The first receiving groove 522 is used to receive and fix the second fixing block 332 so as to dispose the second fixing portion 312 of the first conductive terminal 31 overhead in the first receiving groove 522. This arrangement not only improves the shielding effect on the first conductive terminal 31, but also avoids short circuit due to contact between the second fixing portion 312 and the mounting block 5.

The second receiving groove 532 is used to receive and fix the fourth fixing block 342 so as to dispose the fourth fixing portion 322 of the second conductive terminal 32 overhead in the second receiving groove 532. Such an arrangement not only improves the shielding effect on the second conductive terminal 32, but also avoids a short circuit due to contact between the fourth fixing portion 322 and the mounting block 5.

In one embodiment of the present disclosure, the base 51 further defines a plurality of first through holes 513 and a plurality of second through holes 514 extending through the top surface 511 and the bottom surface 512. The first through holes 513 are used to allow the first mounting feet 313 of the first signal terminals S1 and the second signal terminals S2 in the corresponding first terminal module 31*a* to pass through. The second through holes 514 are used to allow the second mounting feet 323 of the third signal terminals S3 and the fourth signal terminals S4 in the corresponding second terminal module 32*a* to pass through. The first mounting feet 313 and the second mounting feet 323 are used for being mounted to the circuit board 200.

Figure 5:
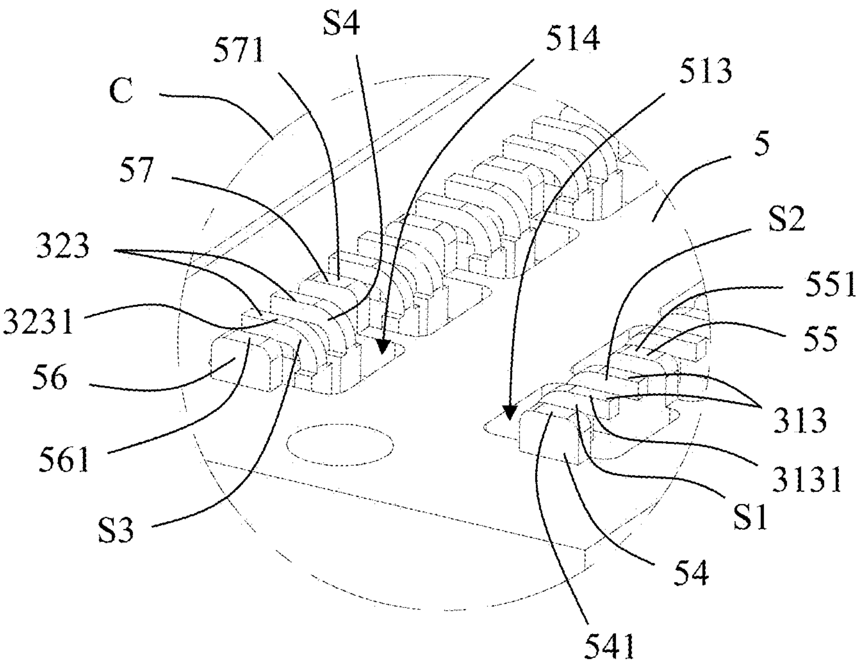
FIG. 5 is a partial enlarged view of a circled part C in FIG. 4.
Figure 6:
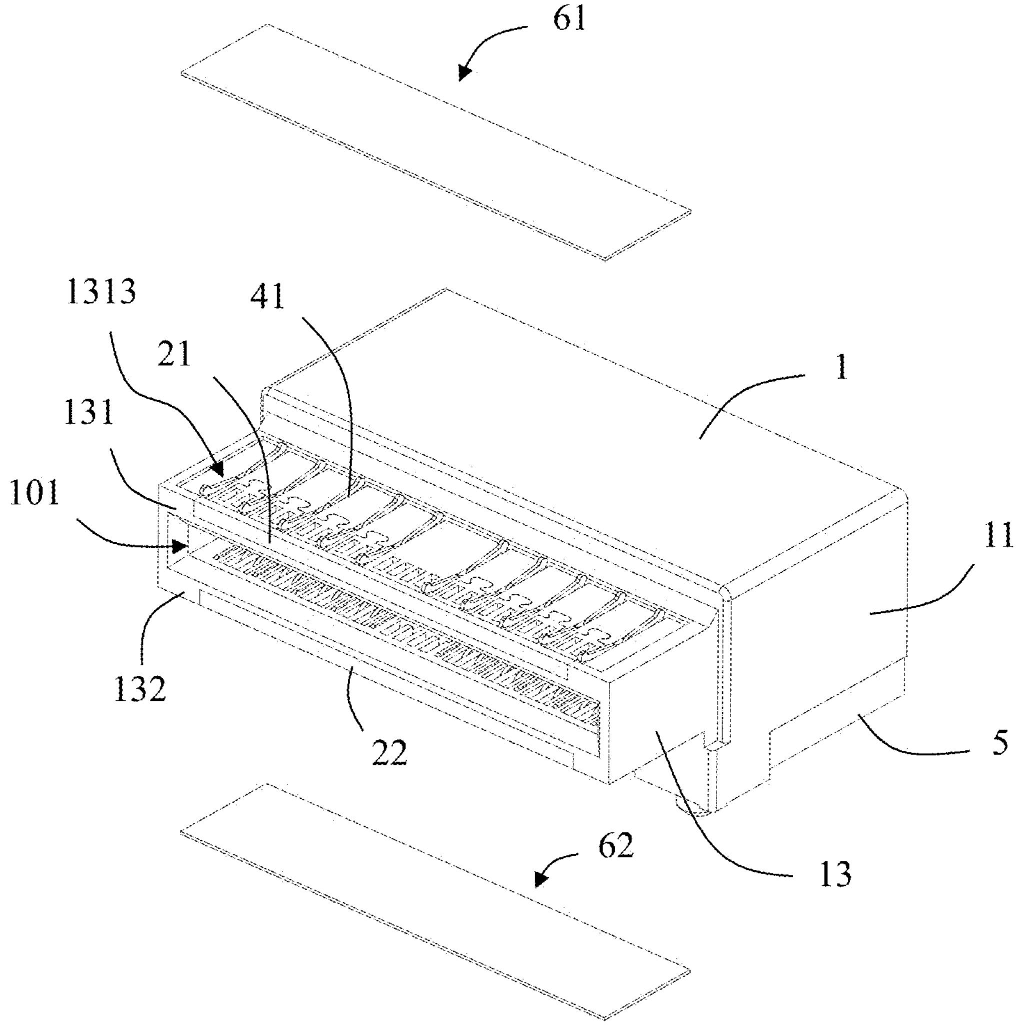
FIG. 6 is a partially exploded perspective view of the electrical connector of the present disclosure.
Figure 7:
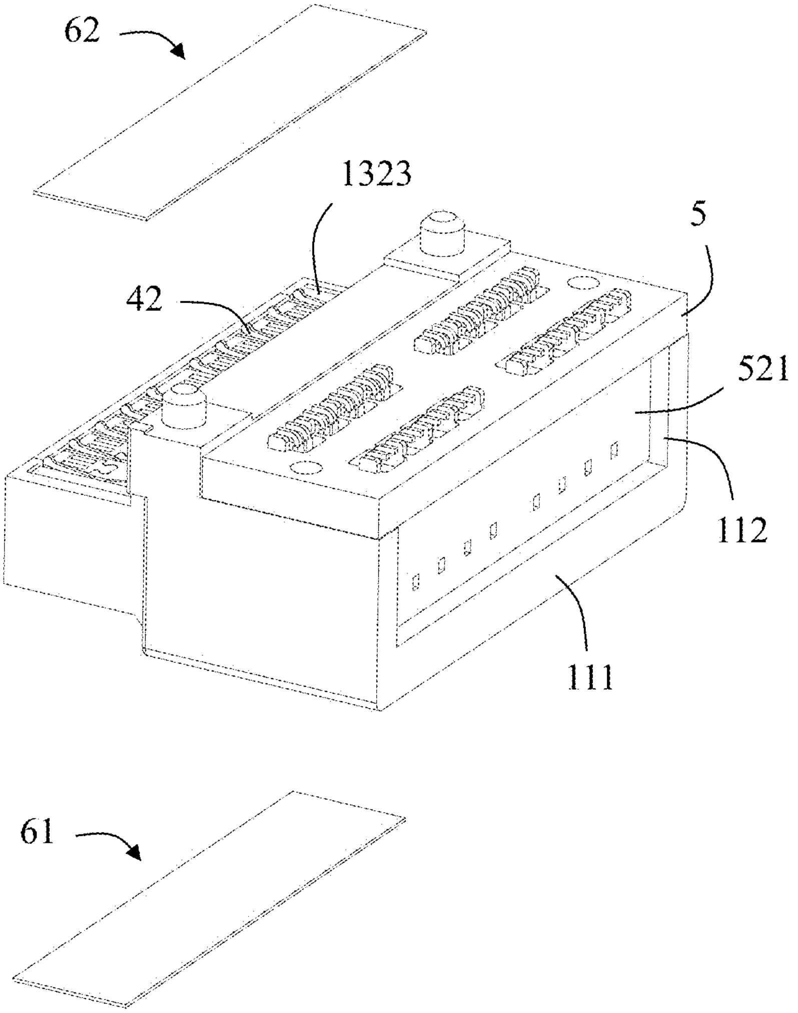
FIG. 7 is a partially exploded perspective view of FIG. 6 from another angle.
Figure 8:
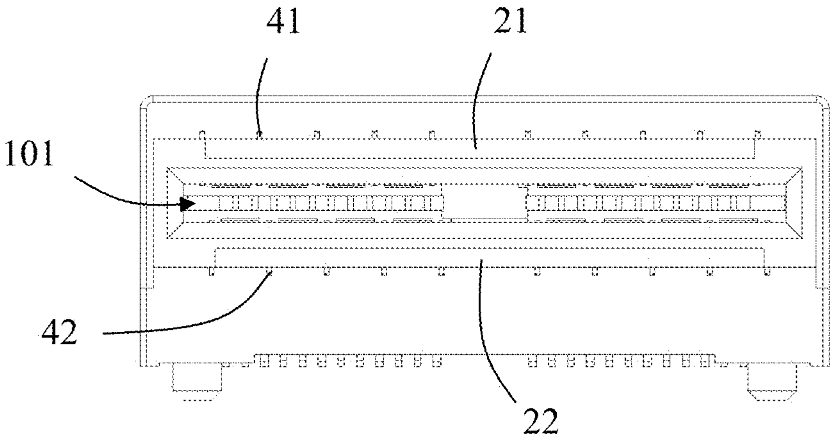
FIG. 8 is a front view of the electrical connector after removing a first pressing plate and a second pressing plate in FIG. 6.
Figure 9:
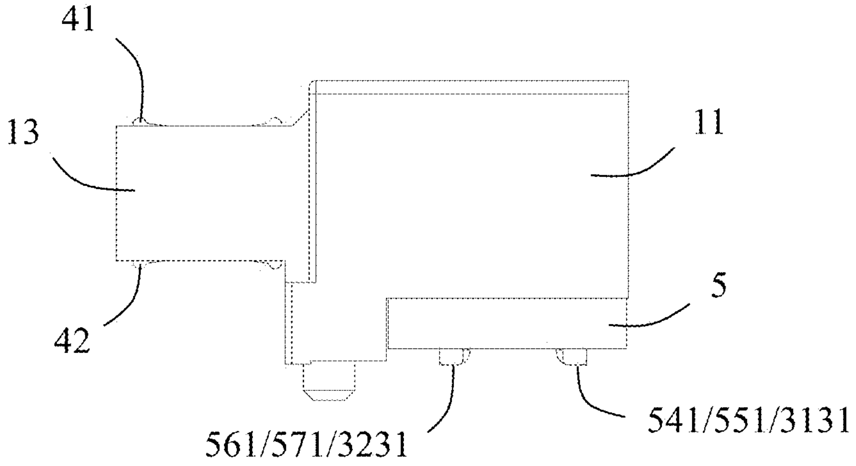
FIG. 9 is a right view of FIG. 8.
Figure 10:
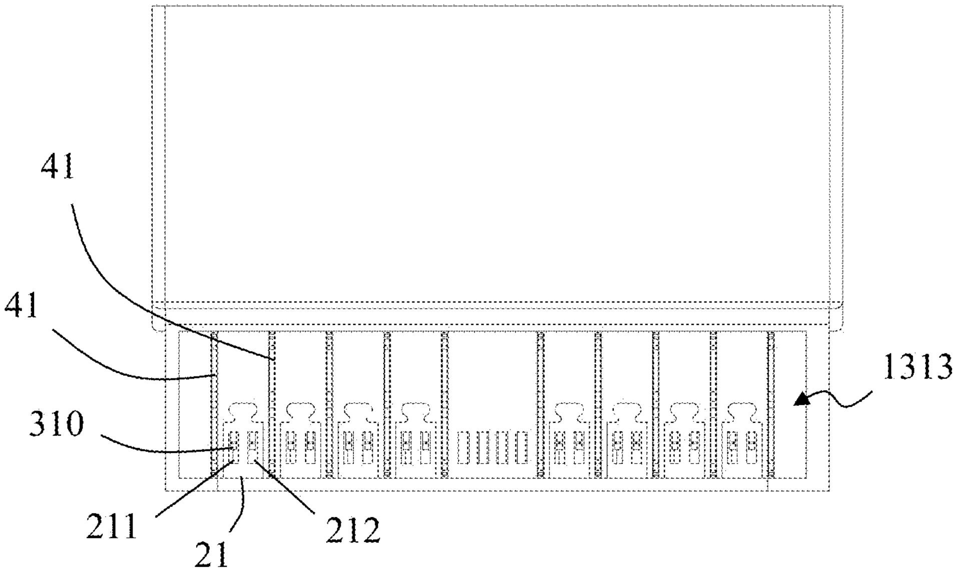
FIG. 10 is a top view of FIG. 8.
Figure 11:
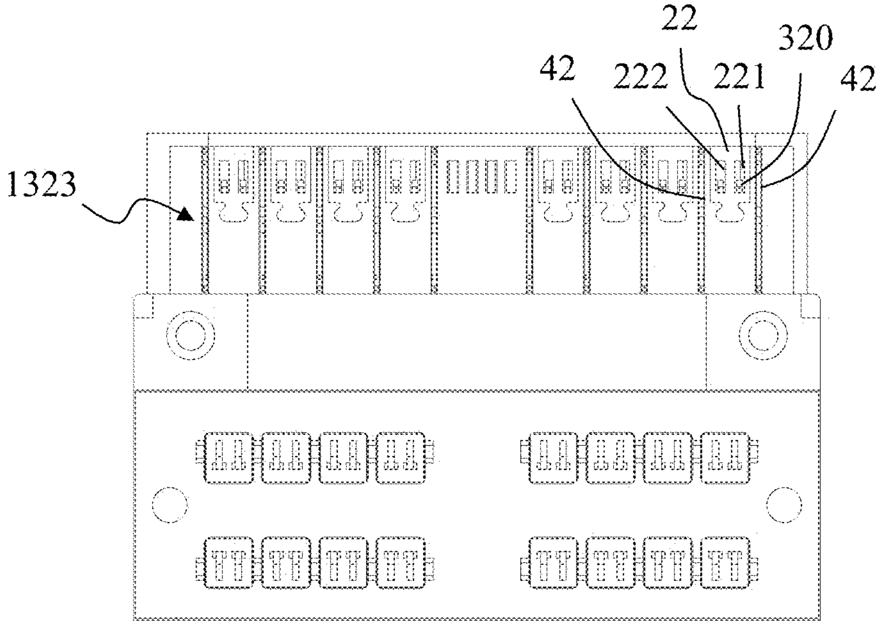
FIG. 11 is a bottom view of FIG. 8.

Referring to FIG. 5, in an embodiment of the present disclosure, in order to improve the shielding of the first mounting feet 313 and the second mounting feet 323, the electrical The connector 100 further includes a plurality of first shielding ribs 54, a plurality of second shielding ribs 55, a plurality of third shielding ribs 56 and a plurality of fourth shielding ribs 57. In an embodiment of the present disclosure, the plurality of first shielding ribs 54, the plurality of second shielding ribs 55, the plurality of third shielding ribs 56 and the plurality of fourth 20) shielding ribs 57 are all provided on the mounting block 5 and protrude downwardly from the bottom surface 512 of the base 51. Each first through hole 513 is associated with one first shielding rib 54 and one second shielding rib 55 on two sides thereof, respectively, so as to better shield the first mounting feet 313 of a group of the first signal terminal S1 and the second signal terminal S2 in first terminal module 31*a*, thereby improving the quality of signal transmission. Each second through hole 514 is associated with one third shielding rib 56 and one fourth shielding rib 57 on two sides thereof, respectively, so as to better shield the second mounting feet 323 of a group of the third signal terminal S3 and the fourth signal terminal S4 in the second terminal module 32*a*, thereby improving the quality of signal transmission.

In an embodiment of the present disclosure, the first shielding rib 54, the second shielding rib 55, the third shielding rib 56 and the fourth shielding rib 57 are all integrally formed with the base 51. Of course, in other embodiments, the first shielding rib 54, the second shielding rib 55, the third shielding rib 56 and the fourth shielding rib 57 can also be made separately from the base 51, and then assembled and fixed to the base 51.

As shown in FIG. 5, in an embodiment of the present disclosure, the first shielding ribs 54 and the third shielding ribs 56 are disposed at intervals along the first direction A1-A1. The second shielding ribs 55 and the fourth shielding ribs 57 are disposed at intervals along the first direction A1-A1. The first shielding rib 54 and the third shielding rib 56 are aligned along the first direction A1-A1. The second shielding rib 55 and the fourth shielding rib 57 are aligned along the first direction A1-A1.

The first shielding rib 54 includes a first lower mounting surface 541. The second shielding rib 55 includes a second lower mounting surface 551. The third shielding rib 56 includes a third lower mounting surface 561. The fourth shielding rib 57 includes a fourth lower mounting surface 571. The first mounting foot 313 includes a first lower contact surface 3131. The second mounting foot 323 includes a second lower contact surface 3231. In order to improve the reliability of contact, in the illustrated embodiment of the present disclosure, the first lower mounting surface 541, the second lower mounting surface 551, the third lower mounting surface 561, the fourth lower mounting surface 571, the first lower contact surface 3131 and the second lower contact surface 3231 are all coplanar.

When the electrical connector 100 is mounted to the circuit board 200, the first shielding ribs 54 and the second shielding ribs 55 are in contact with the corresponding first ground conductive pads 2033 and the second ground conductive pads 2034, respectively. The third shielding ribs 56 and the fourth shielding ribs 57 are in contact with the corresponding third ground conductive pads 2043 and the fourth ground conductive pads 2044, respectively. The first mounting foot 313 of the first terminal module 31*a* are in contact with the corresponding first signal conductive pads 2031 and the second signal conductive pads 2032. The second mounting feet 323 of the second terminal module 32*a* are in contact with the corresponding third signal conductive pads 2041 and the fourth signal conductive pads 2042. In an embodiment of the present disclosure, the first shielding ribs 54 and the second shielding ribs 55 are soldered or welded to the corresponding first ground conductive pads 2033 and the second ground conductive pads 2034, respectively. The third shielding ribs 56 and the fourth shielding ribs 57 are soldered or welded to the corresponding third ground conductive pads 2043 and the fourth ground conductive pads 2044, respectively.

Figure 22:
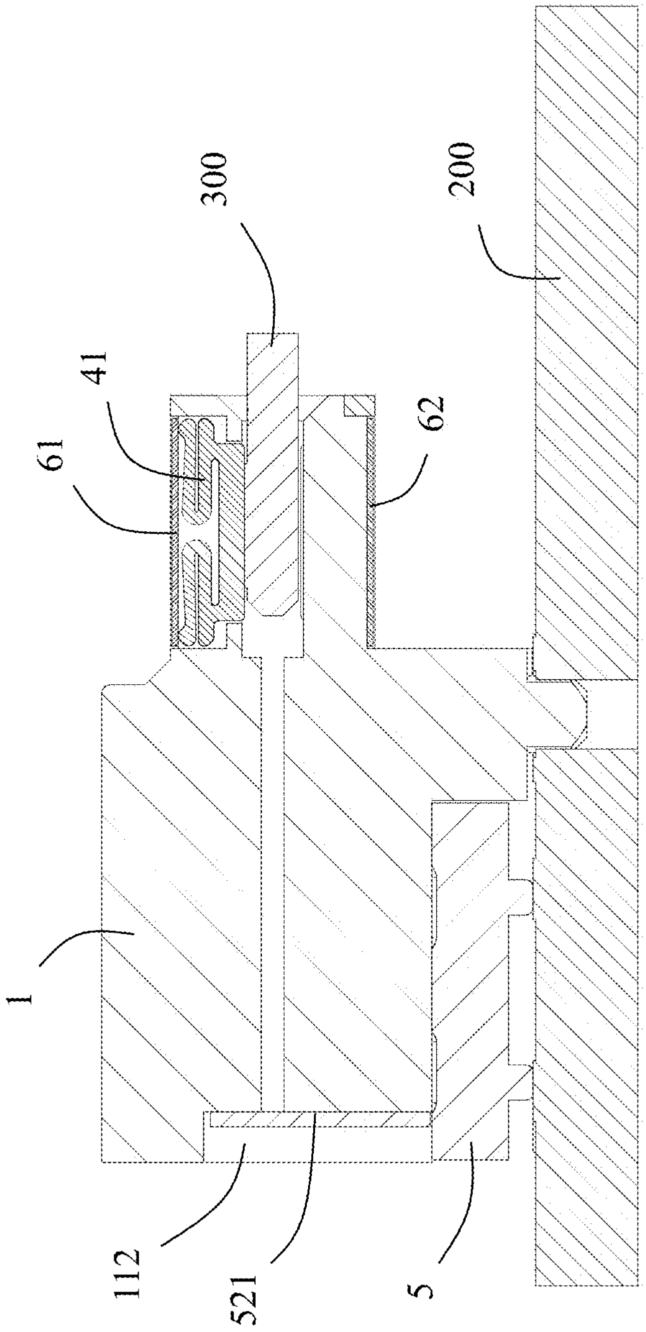
FIG. 22 is a schematic cross-sectional view taken along line B1-B1 in FIG. 1.
Figure 23:
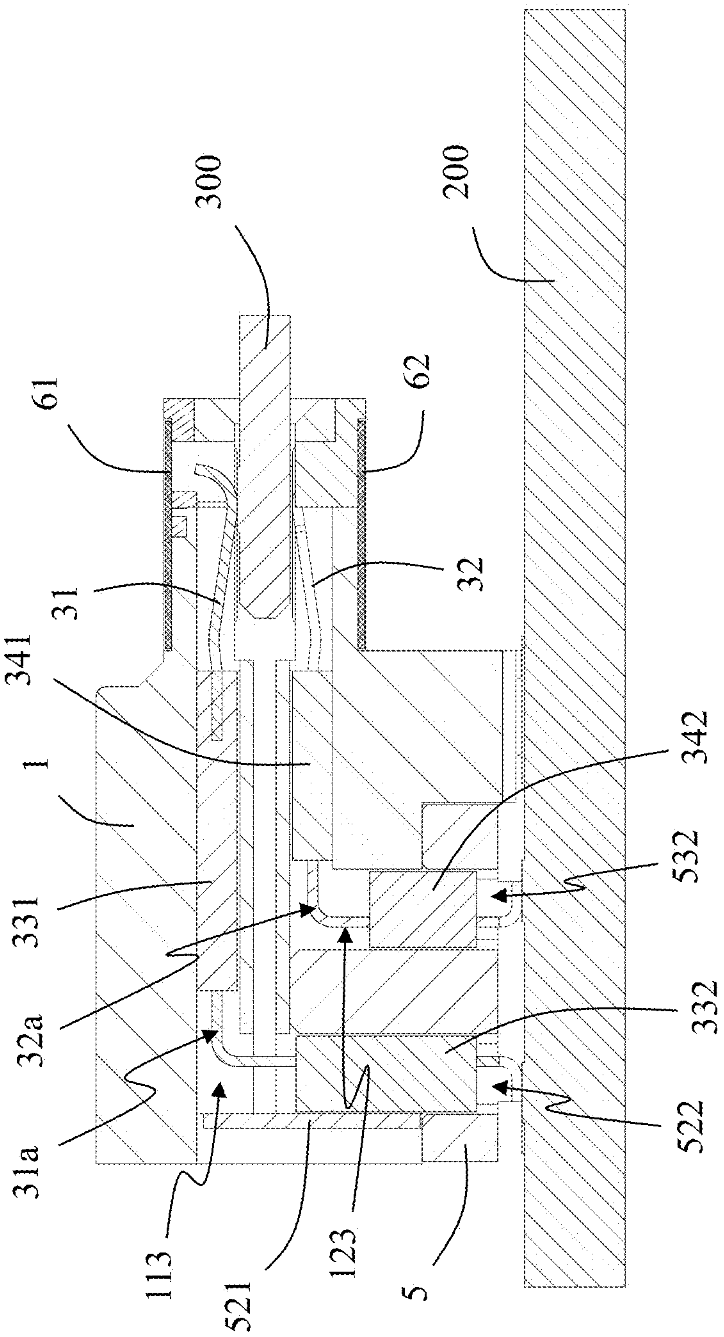
FIG. 23 is a schematic cross-sectional view taken along line B2-B2 in FIG. 1.

Referring to FIGS. 12 to 15. FIG. 22 and FIG. 23, in the illustrated embodiment of the present disclosure, the electrical connector 100 further includes a back plate 521. The back plate 521 is installed in the back plate mounting groove 112. The back plate 521 shields the second fixing portions 312 of the first conductive terminals 31 and the fourth fixing portions 322 of the second conductive terminals 32 so as to form shielding isolation from the outside. In one embodiment of the present disclosure, the back plate 521 is a metal shell made of metal material, so as to further improve the shielding effect and improve the quality of signal transmission. In another embodiment of the present disclosure, the back plate 521 may also be a composite shell formed by electroplating a metal material on an insulating material. The composite shell can also improve the shielding effect and improve the quality of signal transmission. As shown in FIG. 12, in one embodiment of the present disclosure, the back plate 521 and the mounting block 5 are two independent components.

When assembling the electrical connector 100, firstly, the first insulating fixing block 21 is fixed in the first filling grooves 1123, and the second insulating fixing block 22 is fixed in the second filling grooves 1223.

Then, the first terminal modules 31*a* and the second terminal modules 32*a* are installed in the corresponding first terminal module installation slots 113 and the second terminal installation slots 123 from back to front along the first direction A1-A1. At this time, the first fixing block 331 is fixed in the corresponding first terminal module installation slot 113, so that the first fixing portions 311 of the first conductive terminal 31 are arranged overhead in the corresponding first terminal module installation slot 113, thereby avoiding short circuit due to contact with the conductive housing 1. The first contact arm 310 of the first signal terminal S1 at least partially extends into the first slit 211 of the first insulating fixing block 21. The first contact arm 310 of the second signal terminal S2 at least partially extends into the second slit 212 of the first insulating fixing block 21. Similarly, the third fixing block 341 is fixed in the corresponding second terminal module installation slot 123, so that the third fixing portions 321 of the second conductive terminals 32 are arranged overhead in the second terminal module installation slot 123, thereby avoiding short circuit due to contact with the conductive housing 1. The second contact arm 320 of the third signal terminal S3 at least partially extends into the third slit 221 of the second insulating fixing block 22. The second contact arm 320 of the fourth signal terminal S4 at least partially extends into the fourth slit 222 of the second insulating fixing block 22.

Then, the plurality of first ground terminals 41 and the plurality of second ground terminals 42 are installed in the corresponding first terminal installation slots 1312 and the second 30) terminal installation slots 1322, respectively.

Then, the first pressing plate 61 and the second pressing plate 62 are fixed on the top wall 131 and bottom wall 132, respectively.

Then, the mounting block 5 is mounted to the conductive housing 1. The second fixing portions 312 of the first conductive terminals 31 are received in the corresponding first receiving grooves 522; and the fourth fixing portions 322 of the second conductive terminals 32 are received in the corresponding second receiving grooves 532. Each first receiving groove 522 is a surrounding groove surrounded by a plurality of walls of the mounting block 5, and adjacent first receiving grooves 522 are separated from each other. Therefore, the second fixing portion 312 of the first conductive terminal 31 can be better shielded. Each second receiving groove 532 is a surrounding groove surrounded by a plurality of walls of the mounting block 5, and adjacent second receiving grooves 532 are separated from each other. Therefore, the fourth fixing portion 322 of the second conductive terminal 32 can be better shielded. When the mounting block 5 is installed in place, the mounting block 5 contacts rear ends of the first partition walls 114 and rear ends of the second partition walls 124, which is beneficial to further improving the shielding effect.

Then, the back plate 521 is installed in the back plate mounting groove 112.

It is understandable to those skilled in the art that the order of the steps in the above assembly method can be flexibly adjusted as needed, and will not be described in detail in the present disclosure.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

a housing, the housing comprising a receiving slot configured to at least partially receive a mating module along a first direction, a first terminal module installation slot communicating with the receiving slot, and a second terminal module installation slot communicating with the 5 receiving slot;

a first terminal module, the first terminal module being partially received in the first terminal module installation slot; the first terminal module comprising a plurality of first conductive terminals; each first conductive terminal comprising a first fixing portion and a second fixing portion connected to the first fixing portion;

a second terminal module, the second terminal module being partially received in the second terminal module installation slot; the second terminal module comprising a plurality of second conductive terminals; each second conductive terminal comprising a third fixing portion and a fourth fixing portion connected to the third fixing portion; and a mounting block, the mounting block being mounted to the housing; the mounting block comprising a base and a convex block protruding from the base; the base defining a first receiving groove located on one side of the convex block and extending through the base; the base further defining a second receiving groove located on another side of the convex block and extending through the base;

wherein the first fixing portion is at least partially located in the first terminal module installation slot; the second fixing portion is at least partially located in the first receiving groove; the third fixing portion is at least partially located in the second terminal module installation slot; the fourth fixing portion is at least partially located in the second receiving groove; the convex block is located between the second fixing portion and the fourth fixing portion; and wherein the mounting block is a metal housing or a composite housing formed by electroplating a metal material on an insulating material; neither the first conductive terminals nor the second conductive terminals are in contact with the mounting block.

2. The electrical connector according to claim 1, wherein the first terminal module comprises two first conductive terminals which are a first signal terminal and a second signal terminal, respectively; the first terminal module comprises a first fixing block fixed on the first fixing portion of the first signal terminal and the first fixing portion of the second signal terminal; the first terminal module further comprises a second fixing block fixed on the second fixing portion of the first signal terminal and the second fixing portion of the second signal terminal; the first fixing block is received in the first terminal module installation slot, so that the first fixing portion of the first signal terminal and the first fixing portion of the second signal terminal are prevented from contacting the housing; the second fixing block is received in the first receiving groove, so that the second fixing portion of the first signal terminal and the second fixing portion of the second signal terminal are not in contact with the mounting block.

3. The electrical connector according to claim 2, wherein the second terminal module comprises two second conductive terminals which are a third signal terminal and a fourth signal terminal, respectively; the second terminal module comprises a third fixing block fixed on the third fixing portion of the third signal terminal and the third fixing portion of the fourth signal terminal; the second terminal module further comprises a fourth fixing block fixed on the fourth fixing portion of the third signal terminal and the fourth fixing portion of the fourth signal terminal; the third fixing block is received in the second terminal module installation slot, so that the third fixing portion of the third signal terminal and the third fixing portion of the fourth signal terminal are prevented from contacting the housing; the fourth fixing block is received in the second receiving groove, so that the fourth fixing portion of the third signal terminal and the fourth fixing portion of the fourth signal terminal are not in contact with the mounting block.

4. The electrical connector according to claim 2, wherein a plurality of first terminal modules are provided and disposed at intervals along a second direction; the second direction is perpendicular to the first direction; a plurality of first receiving grooves are provided and disposed at intervals along the second direction; each first terminal module is at least partially installed in a corresponding first receiving groove; the base comprises a plurality of third partition walls of which each separates two adjacent first receiving grooves.

5. The electrical connector according to claim 3, wherein a plurality of second terminal modules are provided and disposed at intervals along a second direction; the second direction is perpendicular to the first direction; a plurality of second receiving grooves are provided and disposed at intervals along the second direction; each second terminal module is at least partially installed in a corresponding second receiving groove; the base comprises a plurality of fourth partition walls of which each separates two adjacent second receiving grooves.

6. The electrical connector according to claim 1, wherein the housing is a conductive housing;

the conductive housing is a metal housing; or the conductive housing is a composite housing formed by electroplating a metal material on an insulating material.

7. The electrical connector according to claim 6, wherein a plurality of first terminal module installation slots are provided and disposed at intervals along a second direction; the second direction is perpendicular to the first direction;

a plurality of first terminal modules are provided and disposed at intervals along the second direction; each first terminal module is at least partially installed in a corresponding first terminal module installation slot; the conductive housing comprises a plurality of first partition walls of which each separates two adjacent first terminal module installation slots.

8. The electrical connector according to claim 6, wherein a plurality of second terminal module installation slots are provided and disposed at intervals along a second direction; the second direction is perpendicular to the first direction;

a plurality of second terminal modules are provided and disposed at intervals along the second direction; each second terminal module is at least partially installed in a corresponding second terminal module installation slot; the conductive housing comprises a plurality of second partition walls of which each separates two adjacent second terminal module installation slots.

9. The electrical connector according to claim 1, further comprising a back plate mounted to a rear side of the housing; the back plate covers the second fixing portion of the first conductive terminal.

10. The electrical connector according to claim 9, wherein the back plate and the mounting block are integrally formed; or the back plate and the mounting block are two components provided separately.

11. An electrical connector, comprising:

a conductive housing, the conductive housing comprising a receiving slot configured to at least partially receive a mating module along a first direction, a first terminal module installation slot communicating with the receiving slot, and a second terminal module installation slot 20) communicating with the receiving slot;

a first terminal module, the first terminal module being partially received in the first terminal module installation slot; the first terminal module comprising a plurality of first conductive terminals; each first conductive terminal comprising a first fixing portion and a second fixing portion connected to the first fixing portion;

a second terminal module, the second terminal module being partially received in the second terminal module installation slot; the second terminal module comprising a plurality of second conductive terminals; each second conductive terminal comprising a third fixing portion and a fourth fixing portion connected to the third fixing portion; and a mounting block, the mounting block being mounted to the conductive housing; the mounting block comprising a base and a convex block protruding from the base; the base defining a first receiving groove located on one side of the convex block and extending through the base; the base further defining a second receiving groove located on another side of the convex block and extending through the base;

wherein the first fixing portion is at least partially located in the first terminal module installation slot; the second fixing portion is at least partially located in the first receiving groove; the third fixing portion is at least partially located in the second terminal module installation slot; the fourth fixing portion is at least partially located in the second receiving groove; the convex block is located between the second fixing portion and the fourth fixing portion; and wherein the mounting block is a metal housing or a composite housing formed by electroplating a metal material on an insulating material; the mounting block is in contact with the conductive housing; neither the first conductive terminals nor the second conductive terminals are in contact with the mounting block.

12. The electrical connector according to claim 11, wherein the first terminal module comprises two first conductive terminals which are a first signal terminal and a second signal terminal, respectively; the first terminal module comprises a first fixing block fixed on the first fixing portion of the first signal terminal and the first fixing portion of the second signal terminal; the first terminal module further comprises a second fixing block fixed on the second fixing portion of the first signal terminal and the second fixing portion of the second signal terminal; the first fixing block is received in the first terminal module installation slot, so that the first fixing portion of the first signal terminal and the first fixing portion of the second signal terminal are prevented from contacting the conductive housing; the second fixing block is received in the first receiving groove, so that the second fixing portion of the first signal terminal and the second fixing portion of the second signal terminal are not in contact with the mounting block.

13. The electrical connector according to claim 12, wherein the second terminal module comprises two second conductive terminals which are a third signal terminal and a fourth signal terminal, respectively; the second terminal module comprises a third fixing block fixed on the third fixing portion of the third signal terminal and the third fixing portion of the fourth signal terminal; the second terminal module further comprises a fourth fixing block fixed on the fourth fixing portion of the third signal terminal and the fourth fixing portion of the fourth signal terminal; the third fixing block is received in the second terminal module installation slot, so that the third fixing portion of the third signal terminal and the third fixing portion of the fourth signal terminal are prevented from contacting the conductive housing; the fourth fixing block is received in the second receiving groove, so that the fourth fixing portion of the third signal terminal and the fourth fixing portion of the fourth signal terminal are not in contact with the mounting block.

14. The electrical connector according to claim 12, wherein a plurality of first terminal modules are provided and disposed at intervals along a second direction; the second direction is perpendicular to the first direction; a plurality of first receiving grooves are provided and disposed at intervals along the second direction; each first terminal module is at least partially installed in a corresponding first receiving groove; the base comprises a plurality of third partition walls of which each separates two adjacent first receiving grooves.

15. The electrical connector according to claim 13, wherein a plurality of second terminal modules are provided and disposed at intervals along a second direction; the second direction is perpendicular to the first direction; a plurality of second receiving grooves are provided and disposed at intervals along the second direction; each second terminal module is at least partially installed in a corresponding second receiving groove; the base comprises a plurality of fourth partition walls of which each separates two adjacent second receiving grooves.

16. The electrical connector according to claim 11, wherein the conductive housing is a metal housing; or the conductive housing is a composite housing formed by electroplating a metal material on an insulating material.

17. The electrical connector according to claim 16, wherein a plurality of first terminal module installation slots are provided and disposed at intervals along a second direction; the second direction is perpendicular to the first direction;

a plurality of first terminal modules are provided and disposed at intervals along the second direction; each first terminal module is at least partially installed in a corresponding first terminal module installation slot; the conductive housing comprises a plurality of first partition walls of which each separates two adjacent first terminal module installation slots.

18. The electrical connector according to claim 16, wherein a plurality of second terminal module installation slots are provided and disposed at intervals along a second direction; the second direction is perpendicular to the first direction;

a plurality of second terminal modules are provided and disposed at intervals along the second direction; each second terminal module is at least partially installed in a corresponding second terminal module installation slot; the conductive housing comprises a plurality of second partition walls of which each separates two adjacent second terminal module installation slots.

19. The electrical connector according to claim 11, further comprising a back plate mounted to a rear side of the conductive housing; the back plate covers the second fixing portion of the first conductive terminal.

20. The electrical connector according to claim 19, wherein the back plate and the mounting block are integrally formed; or the back plate and the mounting block are two components provided separately.

* * * * *